(12) United States Patent
Kawakami et al.

(10) Patent No.: US 6,372,387 B1
(45) Date of Patent: Apr. 16, 2002

(54) SECONDARY BATTERY HAVING AN ION CONDUCTIVE MEMBER AND MANUFACTURING PROCESS THEREOF

(75) Inventors: Soichiro Kawakami; Tomoya Yamamoto, both of Nara; Hironao Kimura, Suwa, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/282,417

(22) Filed: Mar. 31, 1999

(30) Foreign Application Priority Data

Mar. 31, 1998 (JP) .......................... 10-086197
Mar. 19, 1999 (JP) .......................... 11-075466

(51) Int. Cl.$^7$ ................................ H01M 6/16
(52) U.S. Cl. ............... 429/303; 429/304; 429/306; 429/314; 429/317; 429/322; 429/324; 429/188
(58) Field of Search ................... 429/304, 306, 429/303, 314, 317, 322, 324

(56) References Cited

U.S. PATENT DOCUMENTS

| | | | | |
|---|---|---|---|---|
| 4,786,277 A | * | 11/1988 | Powers et al. | ................. 604/20 |
| 5,280,078 A | * | 1/1994 | Gregor et al. | ............ 525/328.5 |
| 5,609,974 A | | 3/1997 | Sun | ............................ 429/192 |

OTHER PUBLICATIONS

A. N. Dey et al., "The Electrochemical Deposition of Propylene Carbonate on Graphite," J. Electrochem. Soc., vol. 117, No. 2, pp. 222–224 (1970).

* cited by examiner

Primary Examiner—Gabrielle Brouillette
Assistant Examiner—Angela J. Martin
(74) Attorney, Agent, or Firm—Fitzpatrick, Cella, Harper & Scinto

(57) ABSTRACT

A secondary battery comprises a negative electrode and a positive electrode which oppose each other and an ion conductive member which includes a layered or columnar structure (ion channels) in its matrix and which is sandwiched between the negative electrode and the positive electrode.

54 Claims, 8 Drawing Sheets

20.0kV (×500)     48.0 μm

FIG. 11AP
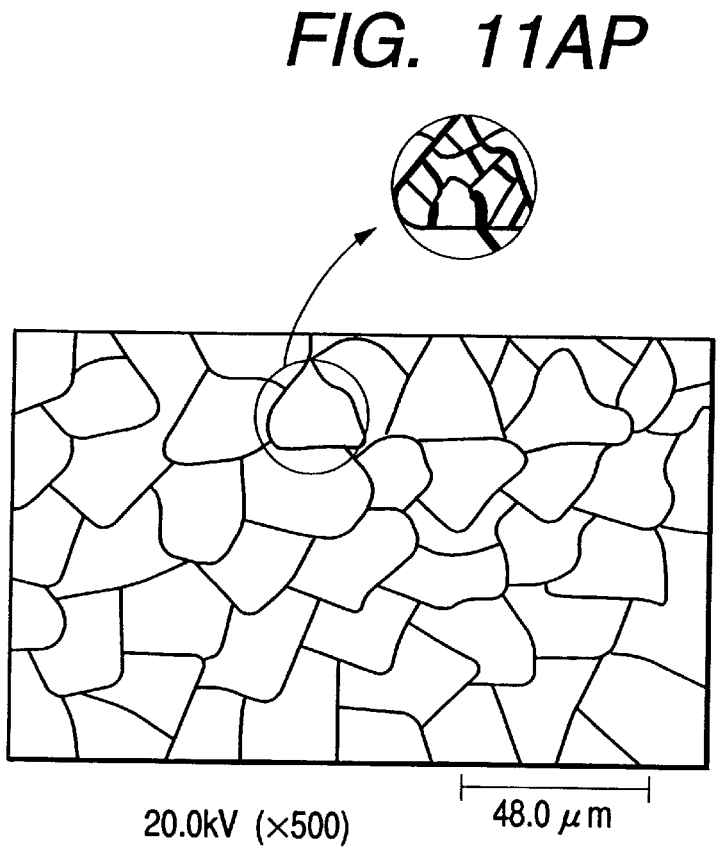
FIG. 11A
20.0kV (×500)　48.0 μm
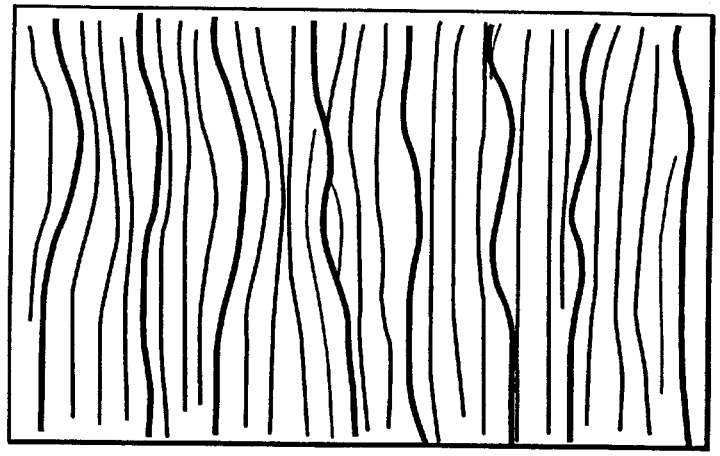
FIG. 11B

SECONDARY BATTERY HAVING AN ION CONDUCTIVE MEMBER AND MANUFACTURING PROCESS THEREOF

BACKGROUND OF THE INVENTION

1. Field of the Invention

The present invention relates to a secondary battery having an ion conductive member, and a manufacturing process thereof. More particularly, it relates to a secondary battery in which the decomposition of an electrolyte solution attributed to the repetition of charge and discharge is suppressed.

2. Related Background Art

Since the quantity of carbon dioxide gas contained in the atmosphere is currently increasing, the warming of the earth is predicted to increase due to the greenhouse effect. It has, therefore, become difficult to build new thermal power stations which emit carbon dioxide gas in large quantities. In this regard, for the purpose of effectively utilizing electric power generated by a dynamo of a thermal power station or the like, so-called "load leveling" has been proposed, wherein night power is stored in secondary batteries installed in general households and is used in the daytime when large power consumption is required, thereby leveling a station load. Meanwhile, the development of a secondary battery of higher energy density has been expected in the field of electric vehicles, which features the emission of no air-pollutive substances. Further, it is of urgent necessity to develop high-performance secondary batteries which are smaller in size and lighter in weight for use in the power sources of portable apparatuses such as notebook type personal computers, word processors, video cameras and pocket telephones.

As the high-performance secondary battery of smaller size and lighter weight, an example wherein a lithium-graphite interlayer compound is applied to the negative electrode of a secondary battery was reported in JOURNAL OF THE ELECTROCHEMICAL SOCIETY, 117, 222 (1970). Since then, by way of example, a rocking chair type secondary battery, i.e., a so-called "lithium ion battery" has been developed wherein a carbonaceous material is employed as a negative-electrode active material, while an interlayer compound doped with lithium ions is employed as a positive-electrode active material, and wherein lithium is introduced and kept between the layers of the carbonaceous material by a charge reaction. Some articles of this type are being put into practical use. With the lithium ion battery, the carbonaceous material as a host material which is intercalated between the layers using lithium as a guest is applied to the negative electrode, thereby suppressing the growth of the dendrite of lithium during charge and achieving a longer lifetime in charge and discharge cycles.

However, an organic solvent is used as the solvent of an electrolyte solution in the secondary battery utilizing galvanic reactions (charge and discharge reactions) based on lithium ions, such as the lithium-ion secondary battery. Therefore, when the battery is overcharged, the solvent is decomposed thereby producing carbonic acid gas, hydrocarbons, etc., and it is not restored to its original state by a recombination reaction. It is accordingly believed that the electrolyte solution will deteriorate thereby increasing the internal impedance of the secondary battery. Further, the overcharge of the secondary battery causes internal short circuiting thereof, along with the generation of heat and promotion of a reaction which rapidly decomposes the solvent, which can lead to the breakage of the battery.

In order to prevent the secondary battery from degrading as stated above, the battery is sometimes furnished with an overcharge prevention circuit, a PTC (Positive Temperature Coefficient) element whose resistance increases with the rise of temperature or the like. This contrivance, however, increases cost.

Besides, in order to solve the drawbacks of the decomposition and deterioration of the electrolyte solution in the secondary battery which utilizes the charge and discharge reactions based on lithium ions, U. S. Pat. No. 5,609,974 has proposed a secondary battery which adopts a solid polymer electrolyte, obtained in such a way that monomers of three types—a diacrylate type, a monoacrylate type, and an acrylate type including a carbonate group—are copolymerized in the presence of both an organic solvent and a supporting electrolyte and in which coke and a lithium cobalt oxide are respectively applied to a negative electrode and a positive electrode. The solid polymer electrolyte, however, exhibits an ionic conductivity which is below ¼ as compared with that of a liquid electrolyte in which a supporting electrolyte is dissolved in a solvent. Consequently, a current density in the secondary battery is limited, and an energy density is also low.

On the other hand, an electrolyte solidifying technique which prevents liquid leakage while avoiding degradation in performance to the extent possible has been required also of a high-performance alkaline storage battery (secondary battery) which uses a hydrogen-occlusion alloy or the like for a negative electrode.

SUMMARY OF THE INVENTION

The present invention has been made in view of the problems stated above, and it has for its object to provide an electrolyte for use in a secondary battery, which is immune against deterioration and decomposition in the charge and discharge reactions of the secondary battery and a novel secondary battery which employs the electrolyte.

The first mode of the present invention consists of a secondary battery wherein an ion conductive member is arranged between a positive electrode and a negative electrode which are disposed in opposition to each other, characterized in that said ion conductive member has its ion channels oriented so as to have a higher ionic conductivity in a direction of joining a plane of said positive electrode and that of said negative electrode. Herein, the secondary battery shall cover a contrivance wherein said ion conductive member has a layered structure or a columnar structure.

The second mode of the present invention consists of a process for producing a secondary battery wherein an ion conductive member is arranged between a positive electrode and a negative electrode which are disposed in opposition to each other, characterized by orienting ion channels of said ion conductive member so that said ion conductive member may have a higher ionic conductivity in a direction of joining a plane of said positive electrode and that of said negative electrode. Herein, the process for producing the secondary battery shall cover a contrivance wherein said ion conductive member is endowed with a layered structure or a columnar structure.

The ion conductive member which constitutes the secondary battery according to the present invention can be endowed with the layered or columnar structure. In that case, ion conducting paths (ion channels) along which the migrating distances of ions become substantially the shortest are formed in a direction parallel or perpendicular to the layered or columnar structure. Therefore, the ionic conductivity of the ion conductive member becomes the highest in the paths, and the ion conductive member exhibits an anisotropic conductivity. In this regard, according to the secondary battery of the present invention, the direction in which the ionic conductivity of the ion conductive member is higher is brought into agreement with the direction which is perpendicular to the planes of the negative and positive electrodes opposing one another. Thus, the secondary battery of the present invention can have its internal resistance lowered, and it is permitted to be charged and discharged at a higher efficiency and a higher current than any secondary battery which does not adopt the ion conductive member of such a structure.

In addition, the ion conductive member of the layered or columnar structure should preferably be a polymer gel electrolyte which is formed in such a way that a polymer serving as the matrix of the specified structure is caused to absorb an electrolyte solution (a solution obtained by dissolving a supporting electrolyte in a solvent).

The process for producing a secondary battery in the second mode of the present invention can be performed by sandwiching the ion conductive member endowed with the layered or columnar structure between the negative and positive electrodes. The ion conductive member is fabricated in such a way that a cross-linked polymer material having the layered or columnar structure is prepared and is thereafter caused to absorb an electrolyte solution, or that a cross-linked polymer material having the layered or columnar structure is prepared in the presence of an electrolyte. The cross-linked polymer material having the layered or columnar structure can be obtained in such a way that the molecules of a cross-linking polymer are arrayed into a regular arrangement by at least one operation selected from the group consisting of irradiation with light, application of a magnetic field, application of an electric field, and heating, whereupon the resulting molecules are cross-linked. Alternatively, the polymer of the specified structure can be obtained in such a way that a compound which has a molecular structure serving as a template is employed in the operation of preparing the cross-linked polymer.

BRIEF DESCRIPTION OF THE DRAWINGS

FIGS. 11A and 11B are schematic views each showing an image which was obtained when an ion conductive member (a polymer gel electrolyte) in Experiment 4 was observed with the electron microscope. FIG. 11AP is a partially enlarged view of FIG. 11A.

DESCRIPTION OF THE PREFERRED EMBODIMENTS

Now, the aspects of performance of the present invention will be described with reference to the drawings.

First, ion conductive members having a layered structure or a columnar structure as can be employed for the secondary battery of the present invention will be explained with reference to FIGS. 1A and 1B.

Figure 1A:
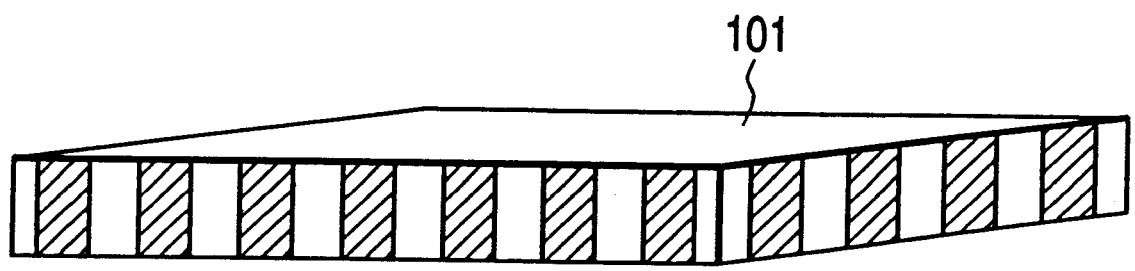
FIGS. 1A and 1B are schematic views each showing an example of an ion conductive member which is adopted for the present invention.
Figure 1B:
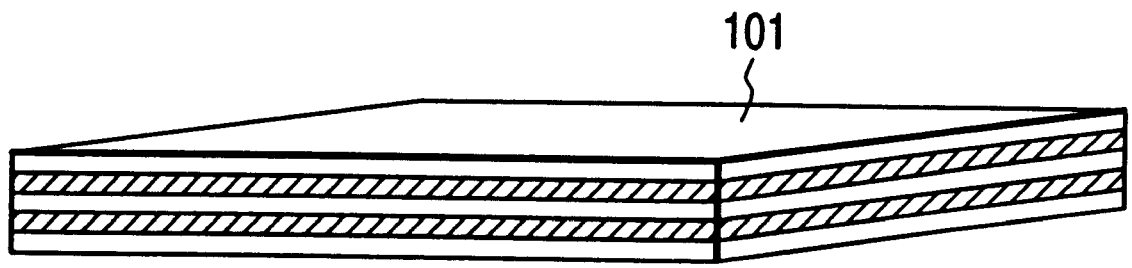

FIGS. 1A and 1B are perspective views each showing the schematic sectional structure of the ion conductive member 101 in the shape of a sheet by way of example. The structure 101 in FIG. 1A is such that the columnar structure or layered structure has grown in a direction perpendicular to the plane of the sheet-like ionically conductive structure. On the other hand, the structure 101 in FIG. 1B is such that the layered structure has grown in a direction parallel to the plane of the sheet-like ionically conductive structure. With the ion conductive member shown in FIG. 1A or FIG. 1B, ion conducting paths (ion channels) along which the migrating distances of ions become substantially the shortest are formed in a direction parallel or perpendicular to the layered or columnar structure. Therefore, the ionic conductivity of the ion conductive member becomes the highest in the paths, and the ion conductive member exhibits an anisotropic conductivity. In the secondary battery of the present invention, the ion conductive member having the layered structure or columnar structure as shown in FIG. 1A or FIG. 1B, which should preferably have a thickness of 500 $\mu$m or below, more preferably a thickness of 100 $\mu$m or below, and the ionic conductivity of which is higher in a direction perpendicular to the planes of a negative electrode and a positive electrode, may be sandwiched between the negative and positive electrodes which oppose each other.

The ion conductive member having the layered structure or columnar structure can be fabricated by preparing a cross-linked polymer which has the layered or columnar structure and which absorbs an electrolyte solution (a solution obtained by dissolving a supporting electrolyte in a solvent). In addition, the layered or columnar structure of the cross-linked polymer can be attained in such a way that molecules constituting a cross-linking polymer are arrayed into a regular arrangement by at least one operation selected from the group consisting of irradiation with light, application of a magnetic field, application of an electric field, and heating, or that molecules constituting a cross-linking polymer are arrayed using a template. Mentioned as an example of such an ion conductive member is a polymer material of the specified structure (a polymer gel electrolyte) which has been brought into a gelatinous state by absorbing an electrolyte solution in which a supporting electrolyte such as lithium salt is dissolved in an organic solvent. In this example, it is possible to form the ion conductive member whose ionic conductivity in the direction of the higher ionic conduction exceeds, at least, $3 \times 10^{-3}$ Scm$^{-1}$ or $5 \times 10^{-3}$ Scm$^{-1}$.

Alternatively, the ion conductive member having the layered structure or columnar structure can be formed in such a way that, under the application of an electric field and/or a magnetic field, an inorganic oxide such as tonically conductive glass is vapor-deposited with a cluster ion beam or electron beam or by sputtering.

Figure 2A:
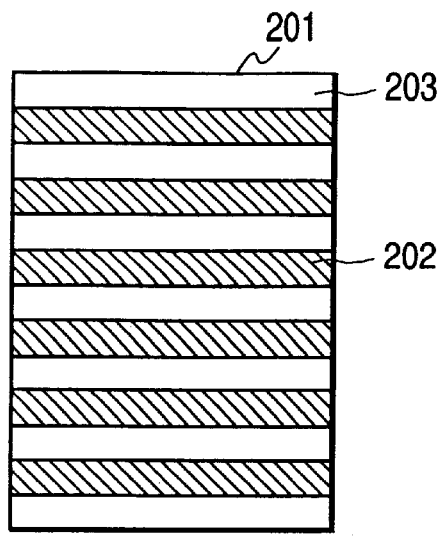
FIGS. 2A and 2B are schematic views for explaining the structure and operation of an ion conductive member which is adopted for the present invention.

Next, the features of an anisotropic ionically conductive structure will be explained with reference to FIGS. 2A and 2B and FIGS. 3A and 3B. FIG. 2A is a schematic view showing the ion conductive member 201. In the matrix 203 of the ion conductive member 201, ion conducting paths (ion channels) 202 being the shortest are so formed that they are arrayed, namely, oriented in a direction parallel to the layered or columnar structure or in a direction perpendicular to the layered structure. Here in the illustration of FIG. 2B, the ion conductive member 201, in which the direction of the shortest ion conducting paths (ion channels) 202 agrees with a direction perpendicular to the planes of electrodes 204 and 205, is arranged between the electrodes 204 and 205, and these electrodes 204 and 205 are connected to a supply voltage source 206.

Figure 3A:
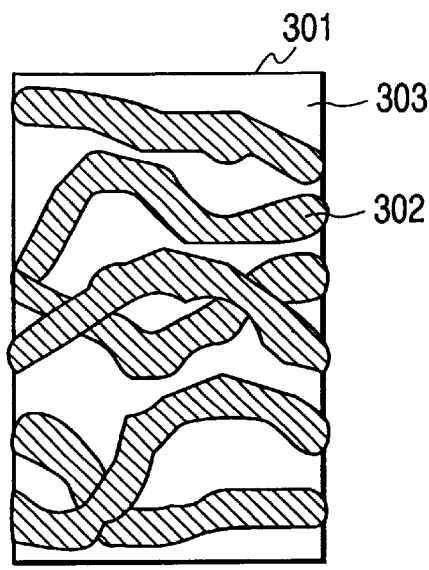
FIGS. 3A and 3B are schematic views for explaining the structure and operation of an ion conductive member in the prior art.
Figure 3B:
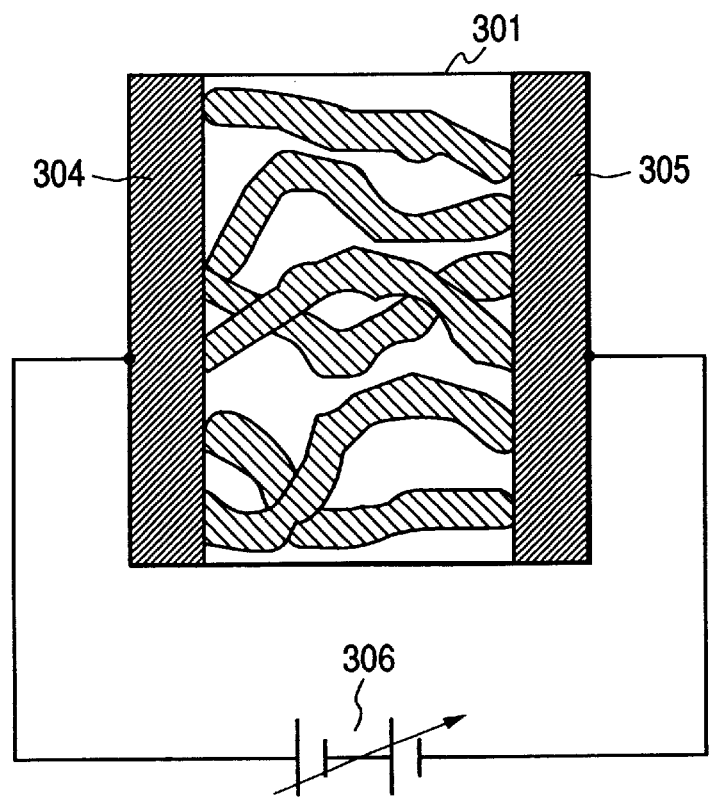

On the other hand, in an ion conductive member 301 shown in FIG. 3A, ion conducting paths (ion channels) 302 are formed in random directions within the matrix 303 of the structure 301. In the illustration of FIG. 3B, the ion conductive member 301 is arranged between electrodes 304 and 305, which are connected to a supply voltage source 306.

Figure 2B:
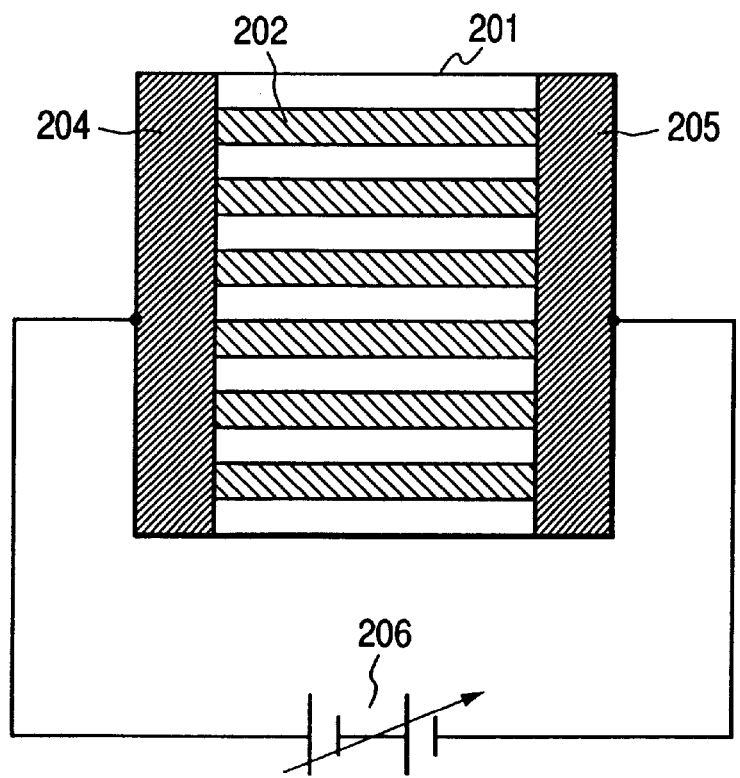

When the ion conductive members 201 and 301, respectively shown in FIG. 2B and FIG. 3B, are compared, the channel length of the former 201 in the direction in which the ion channels 202 are oriented is substantially shorter than that of the latter 301. Therefore, in a case where the numbers of ions and the mobilities thereof in the ion conductive members 201 and 301 are the same, an electric field is applied across the ion conductive members 201 and 301 (between the electrodes 204 and 205, and between the electrodes 304 and 305) so as to cause the ions to migrate in the directions in which the ion channels 202 and 302 are oriented, and an electric field intensity (applied voltage/channel length) becomes higher to afford a higher migrating ionic velocity ((mobility of ions)×(electric field intensity)) in the ion conductive member 201 of the shorter ion channels corresponding to the present invention. Herein, since the ionic conductivity of each structure at issue increases in proportion to the concentration of the ions and the migrating velocity thereof, the ion conductive member 201 exhibits a higher ionic conductivity. Besides, in the ion conductive member 201 shown in FIGS. 2A and 2B, the shortest ion channels are arrayed in the direction perpendicular to the planes of the opposing electrodes, and the ionic conductivity in this direction is selectively higher than in any other direction. Therefore, the ion conductive member 201 exhibits an anisotropy in ion conduction.

Figure 4:
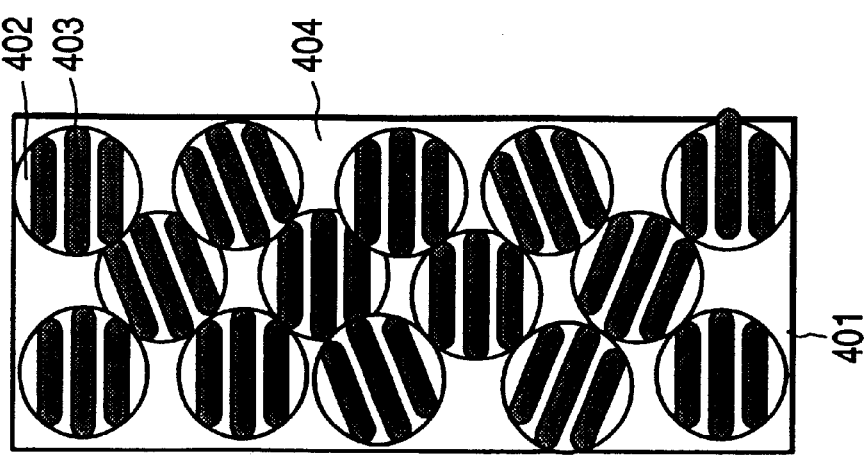
FIG. 4 is a schematic view showing another example of an ion conductive member which is adopted for the present invention.

FIG. 4 illustrates another aspect of the ion conductive member of the present invention. The ion conductive member 401 shown in the figure is an aggregate including a large number of granular ionic conduction elements 402 in each of which ion channels are regularly arranged along a layered or columnar structure 403. Since the shortest ion channels arranged regularly in a certain direction are formed in each granular ionic conduction element 402, a substantially higher ionic conductivity is attained. Incidentally, numeral 404 designates a layer (material) which binds up the granular ionic conduction elements 402. An organic polymer gel, a granular inorganic oxide gel (for example, granular silica gel), or the like can be employed for the granular ionic conduction elements 402. The granular ionic conduction elements 402 can be worked into the shape of a layer or film or a sheet by using a polyethylene oxide or a like resin as a binder. Besides, in a case where the matrix of the granular ionic conduction elements 402 is a cross-linked organic polymer material, these elements 402 can be processed into the shape of a film or sheet by a processing method such as calendering.

Next, the aspects of the secondary battery of the present invention will be schematically explained with reference to FIG. 5 and FIG. 6.

Figure 5:
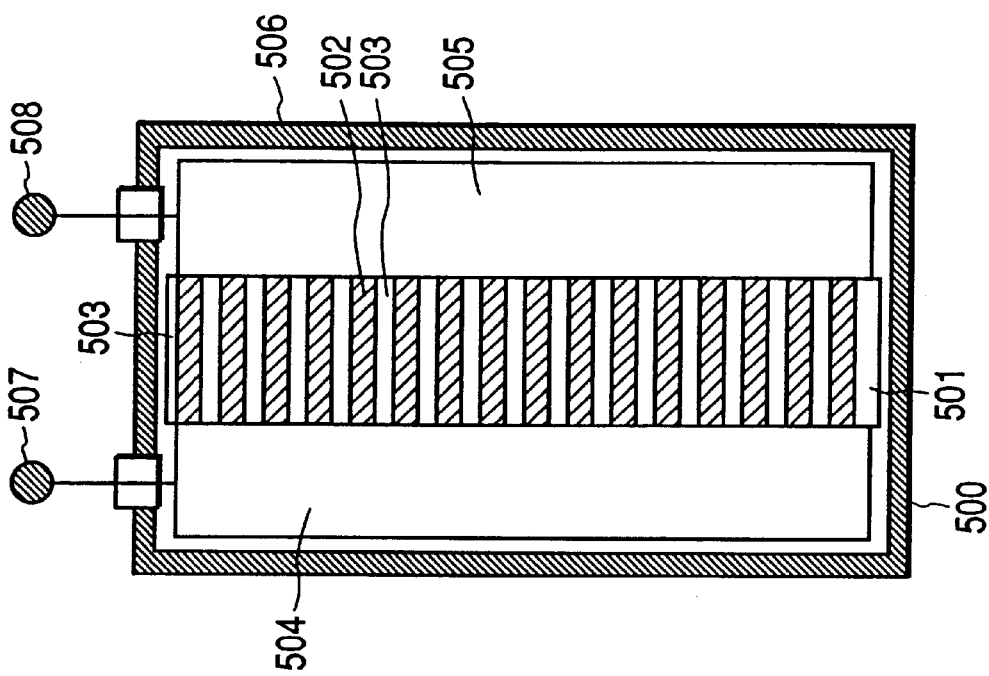
FIG. 5 is a schematic view showing the structure of a secondary battery according to the present invention.

FIG. 5 illustrates the general configuration of the secondary battery of the present invention. In the secondary battery 500 shown in the figure, an ion conductive member 501 having the shortest ion channels 502, which are arrayed in a direction perpendicular to a negative electrode 504 and a positive electrode 505 opposing each other within the matrix 503 of the ion conductive member as shown in FIG. 1A, FIG. 1B or FIG. 2A, is sandwiched between the negative electrode 504 and the positive electrode 505, and the resulting structure is accommodated in a battery jar (housing) 506. By way of example, such a secondary battery 500 is a square battery whose section in a direction normal to the drawing sheet is rectangular. Terminals 507 and 508 for external connection are respectively connected to the negative electrode 504 and the positive electrode 505, and they are connected to an external load or a power source. With the secondary battery 500 thus constructed, the ion conductive member 501 employed has its ion channels 502 oriented along a layered or columnar structure in the direction perpendicular to the planes of the opposing negative electrode 504 and positive electrode 505. Accordingly, the migrating distances of ions between the negative electrode 504 and the positive electrode 505 become the shortest, and the substantial migrating velocity thereof heightens, so that the impedance of the secondary battery is lowered. It is, therefore, possible to realize the secondary battery which can be charged and discharged at higher current densities and which has a higher charge and discharge efficiency.

Figure 6:
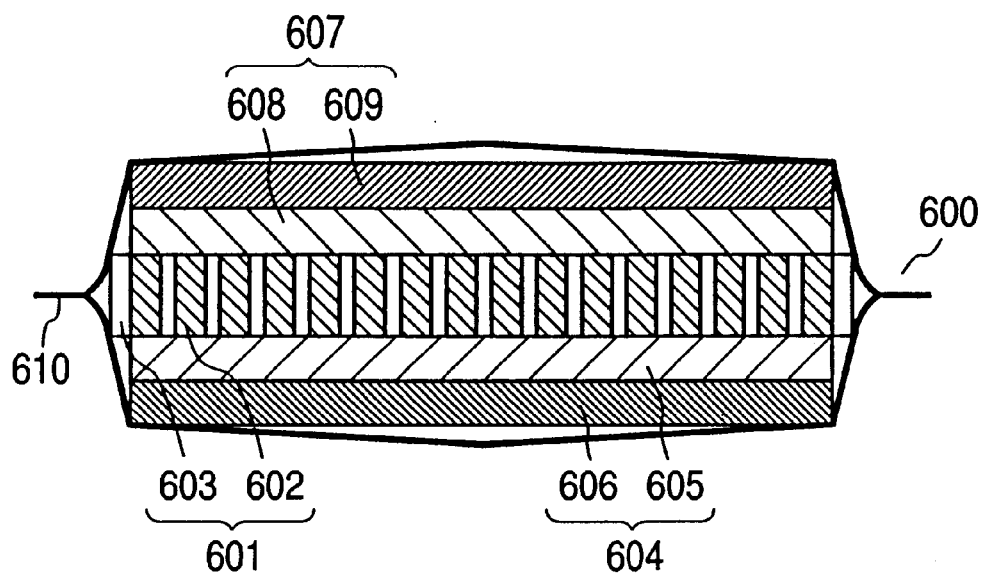
FIG. 6 is a sectional view showing an aspect of a coin-type battery of the present invention.

FIG. 6 illustrates a practicable configuration in which the secondary battery of the present invention is applied to a sheet-like battery. In the secondary battery 600 shown in the figure, an ion conductive member 601 is sandwiched as a separator between a negative electrode 604 including an active material layer 605 on a collector 606 and a positive electrode 607 including an active material layer 608 on a collector 609. The ion conductive member 601 has the shortest ion channels 602 which are formed along a layered or columnar structure and which are arrayed in a direction perpendicular to the opposing negative electrode 604 and positive electrode 607 within the matrix 603 of the ion conductive member as shown in FIG. 1A, FIG. 1B or FIG. 2A, the matrix 603 being oriented in a direction perpendicular to the planes of the positive and negative electrodes and being filled with an electrolyte therein. Besides, the resulting laminated body of the "negative electrode/ion conductive member/positive electrode" has input/output terminals (not shown) led out of the collectors of the respective electrodes and is covered with a sheathing material 610.

Such a secondary battery 600 is charged by connecting an unshown external power source to the input/output terminals, and it accumulates electricity due to electrochemical reactions (migrations of ions between the electrodes) which arise through the ion conductive member 601. Besides, when an unshown external load is connected to the input/output terminals, electrochemical reactions (migrations of ions between the electrodes) arise through the ion conductive member 601 inside the battery, and the battery is discharged.

As in the case of the battery shown in FIG. 5, according to the sheet-like battery, the characteristics of the ion conductive member 601 create the shortest migrating distances of ions between the negative electrode 604 and the positive electrode 607 and heighten the substantial migrating velocity of the ions. It is, therefore, possible to realize the secondary battery whose internal resistance is lower, which can be charged and discharged at higher current densities, and which has a higher charge and discharge efficiency.

Further, the ion conductive member 601 sandwiched between the electrodes is a solid structure or a solidified structure. Unlike a battery including a liquid electrolyte between negative and positive electrodes, accordingly, the sheet-like battery undergoes no liquid leakage even upon damage of the sheathing material 610, and the decomposition of a solvent in the electrolyte on the occasion of overcharge is suppressed. Therefore, a safety mechanism such as a safety valve is dispensed with, the thickness of the battery can be decreased, and an overcharge circuit having been complicated can be replaced with a simple circuit. Moreover, the sheet-like battery can have its shape designed at will, and it can minimize the installation space of a power source in the application thereof to the power source of an apparatus.

By the way, the single pair of electrodes—the positive electrode 607 and the negative electrode 604—are included in the sheet-like battery shown in FIG. 6. It is also possible, however, to construct a secondary battery in a configuration in which a plurality of pairs of electrodes are disposed to form a laminated body consisting of, for example, the "negative electrode/ion conductive member/positive electrode/ion conductive member/negative electrode/ion conductive member/positive electrode", and in which cell units each consisting of the "negative electrode/ion conductive member/positive electrode" are connected in parallel or in series inside the laminated body. It is further possible that the cell units each consisting of the "negative electrode/ion conductive member/positive electrode" are assembled into the battery housing of a battery in a shape as will be stated later, such as a coin-shaped battery, a cylindrical battery or a square battery.

Now, members constituting the secondary battery of the present invention and processes for producing them will be described in detail.

ION CONDUCTIVE MEMBER (101 shown in FIG. 1A and 1B, 201 shown in FIGS. 2A and 2B, 501 shown in FIG. 5, or 601 shown in FIG. 6)

The ion conductive member for use in the secondary battery of the present invention can have a layered structure or a columnar structure. In the case of such a configuration, ion conducting paths (ion channels) along which the migrating distances of ions become substantially the shortest are formed in a direction parallel to the layered or columnar structure or in a direction perpendicular to the layered structure. Therefore, the ionic conductivity of the ion conductive member becomes the highest in the paths, and the ion conductive member exhibits an anisotropic conductivity. The secondary battery of the present invention can be constructed in such a way that the ion conductive member, which has the layered structure or columnar structure and whose ionic conductivity is higher in a direction perpendicular to the planes of a negative electrode and a positive electrode opposing each other, is sandwiched between the negative electrode and the positive electrode.

The material of the ion conductive member having the layered structure or columnar structure for use in the present Invention may be any of, for example, an organic or inorganic gelatinous polymer and an ionically conductive glass, each of which is endowed with a specified molecular orientation. In addition, the glass transition temperature of the ion conductive member for use in the secondary battery of the present invention should preferably be minus 20° C. or below, more preferably be minus 30° C. or below, much more preferably be minus 50° C. or below. The glass transition temperature can be found by the thermal analysis of a measurement based on a compressive load method employing a thermomechanical analyzer, a measurement employing a differential scanning calorimeter, or the like.

The process for producing the ion conductive member made from a polymer gel will now be explained using examples of a process for producing an ion conductive member in which a polymer material having the layered structure or columnar structure is filled with an electrolyte (electrolyte solution), that is, a structure which contains a polymer gel electrolyte.

(a) There are mixed, at least, a monomer which forms a polymer by a polymerizing reaction, a cross-linking agent which forms a polymer gel, and a compound which has a molecular structure serving as a template. Next, the polymerizing reaction and a cross-linking reaction are induced in the resulting mixed solution, thereby preparing a cross-linked polymer having a layered or columnar structure. In the preparation of the cross-linked polymer, a solvent is mixed as may be needed. Subsequently, the resulting cross-linked polymer is caused to absorb and carry an electrolyte solution in which a supporting electrolyte is dissolved in a solvent, thereby forming a polymer gel electrolyte. If possible, the compound for the template should desirably be removed after the preparation of the cross-linked polymer. Alternatively, a polymer gel ionically conductive structure filled with the electrolyte solution may well be fabricated at a stroke by adding the electrolyte solution before the polymerizing reaction.

(b) There are mixed, at least, a polymer material, a solvent which dissolves the polymer, a cross-linking agent, and a compound which has a molecular structure serving as a template. Next, a cross-linking reaction is induced in the resulting mixed solution, thereby preparing a cross-linked polymer having a layered or columnar structure. Subsequently, the prepared cross-linked polymer is caused to absorb and carry an electrolyte solution in which a supporting electrolyte is dissolved in a solvent, thereby forming a polymer gel electrolyte. The compound for the template should desirably be removed after the preparation of the cross-linked polymer. Alternatively, a polymer gel ionically conductive structure filled with the electrolyte solution may well be fabricated at a stroke by adding the electrolyte solution before the cross-linking reaction.

The ion conductive member made from the polymer gel as fabricated in the above example (a) or (b) can be directly brought into the shape of a film or a sheet by fixing it to a supporting material such as unwoven fabric or by utilizing a technique such as casting. On this occasion, it is preferable that the columnar structure or layered structure grows in a direction perpendicular to the plane of the film or sheet (in the direction of the thickness of the film or sheet) or that the layered structure grows in a direction parallel to the plane of the film or sheet. Thus, it is desirable that paths for conducting ions (ion channels) grow in the direction perpendicular to the plane of the film or sheet.

(c) The preparation of the cross-linked polymer in the process of the above example (a) or (b) is performed by suspension polymerization or emulsion polymerization so as to obtain a granular cross-linked polymer. Alternatively, the cross-linked polymer produced by bulk polymerization is pulverized so as to obtain a powdery cross-linked polymer. Thereafter, the obtained granular or powdery cross-linked polymer of the layered or columnar structure is doped with an electrolyte solution so as to prepare a paste, and a supporting member is coated with the paste, whereby an ionically conductive structural layer of polymer gel electrolyte can be formed. Also, an ionically conductive structural layer of polymer gel electrolyte can be formed in such a way that the granular or powdery cross-linked polymer is mixed with another polymer and a solvent for dissolving the other polymer, so as to prepare a paste, that a supporting member is coated with the paste so as to form a complex layer containing the cross-linked polymer and that the complex layer is thereafter caused to absorb an electrolyte solution. Mentioned as typical examples of the polymer for the complexation are fluoroplastics such as polyvinylidene fluoride, polyolefin such as polyethylene or polypropylene, polyethylene oxide, polyethylene glycol, and polyacrylonitrile.

By the way, in order to enhance a mechanical strength, the ion conductive member explained above can be reinforced in the state in which it is put in a supporting member such as unwoven fabric, or it can be complexed with an inorganic oxide such as porous silica.

Now, the reactions and the used materials in the processes of the above examples (a) thru (c) will be explained in more detail.

Cross-Linked Polymer

A process for preparing a cross-linked polymer of layered structure or columnar structure to serve as the matrix of a polymer gel electrolyte which is an ion conductive member with oriented ion channels is divided into a process in which a monomer is polymerized and cross-linked (the process of the above example (a)) and a process in which a polymer is cross-linked (the process of the above example (b)).

Any of condensation polymerization, addition polymerization and acyclic polymerization can be utilized for a polymerizing reaction in the process for preparing the cross-linked polymer through the polymerization of the monomer. Among all, the addition polymerization can induce a cross-linking reaction by adding during the polymerization a polyfunctional compound such as divinyl compound or trivinyl compound having two or more unsaturated bonds, and the proportion of cross-linkage in the addition polymerization can be easily controlled depending upon the concentration of the compound having the two or more unsaturated bonds, so that the addition polymerization is a more preferable technique for forming the polymer gel portion of the ion conductive member of the present invention. The addition polymerization is divided into radical polymerization and ionic polymerization such as cationic polymerization and anionic polymerization in accordance with reaction mechanisms. In the radical polymerization, an initiator is employed which is decomposed to generate radicals by heating or the absorption of light such as ultraviolet rays, thereby to initiating the polymerizing reaction of the monomer. Mentioned as examples of the initiator are azo compounds such as azo-bis-isobutyronitrile, peroxides such as benzoyl peroxide, potassium persulfate, ammonium persulfate, and light-absorption decomposition compounds of a ketonic compound or metallocenic compound. Examples of the initiator of the cation polymerization include acids such as $H_2SO_4$, $H_3PO_4$, $HClO_4$ or $CCl_3CO_2H$, Friedel-Crafts catalysts such as $BF_3$, $AlCl_3$, $TiCl_4$ or $SnCl_4$, $I_2$, and $(C_6H_5)_3CCl$. Examples of the initiator of the anion polymerization include water, an alkaline metal compound, and a magnesium compound.

As the quantity of addition of the initiator to the monomer, a range of 1 to 10 weight % is preferable, and a range of 2 to 5 weight % is more preferable.

Typical of the monomer to be addition polymerized is a vinyl compound. Mentioned as examples of the vinyl compound are diethyleneglycol ethylether acrylate, diethyleneglycol ethylether methacrylate, diethyleneglycol methylether methacrylate, diethyleneglycol 2-ethylhexylether acrylate, diethylethoxymethylene malonate, 2-acetoxy-3-butenenitrile, allylcyano acetate, 4-allyl-1,2-dimethoxybenzene, acrylonitrile, methyl acrylate, methyl methacrylate, vinyl acetate, ethylene, isoprene, butadiene, styrene, vinyl chloride, vinylidene chloride, isobutyrene, α-methyl styrene, tetradecane diol acrylate, silicone metharylate, fluoroalkyl methacrylate, 2-hydroxyethyl methacrylate, acrylamide, and N-isopropyl acrylamide. It is also preferable to appropriately select the monomers and to mix them for copolymerization. Besides, the monomers should desirably be selected such that the glass transition temperature of the polymer obtained by the polymerization may preferably become minus 20° C. or below, more preferably minus 30° C. or below.

Further, it is preferable to employ a liquid crystalline monomer whose molecules are regularly arrayed by the application of an electric field or a magnetic field or irradiation with light.

On the other hand, concrete examples of a polymer material which serves as a base in a process for preparing a cross-linked polymer by cross-linking the polymer material already obtained are poly(N-iso-propyl acrylamide), poly (methylvinyl ether), poly(N-vinylidene butylamide, the polymer of vinyl ether, poly(γ-benzyl L-glutamate), poly(p-phenylene terephthalamide), polycarbonate, poly(methyl methacrylate), acrylonitrile-butadiene rubber, poly (diisopropyl fumarate), and polyvinylidene fluoride.

A polymer gel electrolyte, which includes a cross-linked polymer and an electrolyte solution absorbed in the cross-linked polymer, is prepared using the polymer material produced by the polymerizing reaction or the already polymerized material as stated above.

A process for preparing the cross-linked polymer (polymer gel) is divided into a process based on chemical bonding and a process based on intermolecular bonding.

The process based on the chemical bonding includes a process in which the polymer is irradiated with an energy radiation such as an electron beam or gamma rays, so as to generate radicals and to induce a cross-linking reaction, and a process in which some active groups of a polymer chain are reacted with a cross-linking agent so as to induce a cross-linking reaction.

Mentioned as concrete examples are a process in which polyvinyl alcohol or cellulose having hydroxyl groups is cross-linked by a chemical reaction with aldehyde, an N-methylol compound, dicarbonic acid, bis-epoxide, or the like; a process in which a polymer having amino acid is caused to gelate with aldehyde or glycyl groups; a process in which polyvinyl alcohol or polymethylvinyl ether is cross-linked in water by irradiating it with radiation such as gamma rays; a process in which polyvinyl alcohol or N-vinyl pyrrolidone is cross-linked with a photo-cross-linking agent such as diazo resin, bis-azide or dichromate; a process in which a water-soluble polymer such as polyvinyl alcohol is photo-dimerized with a polymer having photo-sensitive groups, such as stilbazolate; and a process in which a polymer material is cross-linked in contact with a plasma created by the electric discharge of a gas.

In particular, a process in which the active groups of the side chain of a polymer and a polyfunctional cross-linking agent are reacted for the cross-linkage can be suitably adopted as the process in which the cross-linking reaction is induced by reacting some active groups of the polymer chain with the cross-linking agent. Concrete examples are cross-linking processes which are based on the reaction between the ester bonds or carboxyl groups of the side chain and a diamine compound, the reaction between the amino groups of the side chain and dicarbonic acid, the reaction between the carboxyl groups of the side chain and glycols, and the reaction between the hydroxyl groups of the side chain and dicarbonic acid. Mentioned as the concrete examples of the above amine are triethylene tetramine, tetramethylethylene diamine, diaminooligoethylene amine, and diaminooligoethylene glycol.

In the case where the cross-linking agent is employed in the cross-linking reaction, the proportion of addition thereof should preferably be within a range of 1 to 20 mol %, more preferably within a range of 2 to 10 mol %, relative to 1 mol of the polymer.

On the other hand, the process in which polymer chains are cross-linked by the molecular bonding may be performed by cross-linkage based on hydrogen bonds, cross-linkage based on ionic bonds, or cross-linkage based on coordinate bonds (chelation). Concrete examples include a process in which a polymer is caused to gelate by forming hydrogen bonds between molecules in accordance with freeze vacuum drying, freezing and thawing, or the like; a process in which a gel is formed by mixing two different sorts of polymers such as polymethacrylic acid and polyethylene glycol, and polyacrylic acid and polyvinyl alcohol; a process in which a polyionic complex gel is formed by mixing a polycation such as polyvinylbenzyl trimethylammonium, and a polyanion such as sodium polystyrenesulfonate; and a process in which polycarbonic acid such as polyacrylic acid, or a strong acid polymer such as polystyrene sulfonate, is bonded with an alkaline metal or alkaline earth metal so as to form a gel.

Incidentally, a gel can also be formed in such a way that, at the above stage of the polymerizing reaction for synthesizing a polymer material, a cross-linking reaction is simultaneously caused to proceed by chemical bonding. A cross-linking process in this case may be a process which utilizes the cross-linking reaction based on a condensation polymerization employing a divinyl compound or any other polyfunctional compound, or a process in which, in polymerizing a polymer, the polymerization and the cross-linking reaction are caused to proceed by irradiation with an energy radiation such as heat, light, plasma or any other radiation. Concrete examples include polymerization for which ethyleneglycol dimethacrylate or methylene-bis-acryl amide is compounded as a cross-linking agent, and for which a radical initiator is used; radiation polymerization for which gamma rays or an electron beam are/is projected; and photo-polymerization for which light at a wavelength agreeing with the absorption wavelength of a vinyl monomer is projected in the presence of a cross-linking agent, or for which light is projected after adding a photosensitizer.

Examples of a divinyl compound typical of a bifunctional monomer which functions as a cross-linking agent during addition polymerization include N,N'-methylene-bis-acryl amide; diethyleneglycol dimethacrylate; diethyleneglycol-bis-allyl carbonate; diethyleneglycol diacrylate; tetraethyleneglycol dimethacrylate; 1,4-butanediol diacrylate; pentadecanediol diacrylate; allyl ether; allyl disulfide; and 3-acryloyloxy-2-hydroxypropyl methacrylate. The quantity of addition of the cross-linking agent for the preparation of the cross-linked polymer (polymer gel) should preferably be within a range of 0.1 to 30 mol %, more preferably within a range of 1 to 20 mol %, much more preferably within a range of 2 to 10 mol %, relative to 1 mol of the monomer.

The cross-linked polymer (polymer gel), which is produced via the polymerizing reaction and the cross-linking reaction, should desirably have at least one sort of bond selected from the group consisting of a carbon-oxygen bond, a carbon-nitrogen bond and a carbon-sulfur bond, such that when the polymer is caused to carry an electrolyte solution, the ionic dissociation of an electrolyte may be promoted to attain a higher ionic conductivity. Accordingly, the cross-linked polymer should preferably include at least one sort of functional group which is selected from the group consisting of an ether group, an ester group, a carbonyl group and an amide group. The starting materials of the cross-linked polymer are selected so as to establish such a chemical structure.

Compound which has Molecular Structure Serving as Template

The compound, which has a molecular structure serving as a template and which is employed in the preparation of a cross-linked polymer (polymer gel) having a layered structure or columnar structure, is a compound which is oriented in a certain direction or whose molecules are regularly arrayed, in accordance with an electric field, a magnetic field, light, a temperature, a concentration, a pressure, a material to contact the compound or the surface profile of the material, and the combination of such factors. In the present invention, using the compound which has the molecular structure serving as the template, a monomer is polymerized and cross-linked, or a polymer is cross-linked, whereby the cross-linked polymer (polymer gel) having the layered structure or columnar structure can be prepared, and an ion conductive member whose matrix is the cross-linked polymer (polymer gel) can be formed.

The compound which has the molecular structure serving as the template should preferably be at least one sort of compound selected from the group consisting of a liquid crystalline compound, a diacetylene compound and an amphiphilic compound. Here, the molecular structure of the liquid crystalline compound is a molecular structure including a group such as —CH=N— or —OCCO—, which is geometrically asymmetric and which is cylindrical or flat, or which exhibits in a molecule a great dipole moment or polarization effect and which has an intermolecular interaction.

Liquid-Crystalline Compound

The molecular structure exhibitive of the cylindrical liquid crystallinity should preferably be a molecular structure in which at least one cyclic group has a different terminal group bonded thereto or a molecular structure in which cyclic groups are bonded by a central group (a binding group) and in which the bonded groups have a different terminal group bonded thereto. Mentioned as examples of the above cyclic group are a benzene ring (phenyl group), a trans-type cyclohexane ring (cyclohexyl group), a heterohexacyclic or different heterocyclic group, and a polycyclic group. Examples of the above central group (binding group) to be selected are —CH=N—, —CO—O—, —N=NO—, trans-type —N=N—, trans-type —CH=CH—, —C≡C—, —$C_6H_4$—, and trans-type —$C_6H_{10}$—. The above terminal group should preferably be a group which is selected from among, for example, chemical formulas $C_nH_{2n+1}$—, $C_nH_{2n+1}O$— and CN—.

Examples of the flat liquid crystalline compound are a benzene ring compound, a heterocyclic compound, and a polycyclic compound. It is also desirable that the molecules of the flat liquid crystal are in a columnar arrayal.

As the compound which has the molecular structure serving as the template, the monomer or polymer and the cross-linking agent which are the starting materials of the cross-linked polymer (polymer gel) being the matrix of the ion conductive member of the layered structure or columnar structure may well have the function of orientation as in a liquid crystalline material.

The liquid crystal material, which is employed as the compound having the molecular structure of the template, may be either a low-molecular liquid crystal or a high-molecular liquid crystal which contains the liquid crystalline compound having the above structure, as its component (or which is a simple substance). Examples are a nematic liquid crystal, cholestic liquid crystal, smectic liquid crystal, ferroelectric liquid crystal and discotic liquid crystal, any of which is usable and among which the nematic liquid crystal is more preferable.

Mentioned as examples of a low-molecular nematic liquid crystal are N-(4-methoxybenzilidene-4'-n-butylaniline), N-(4-ethoxybenzilidene-p'-4-butylaniline), p-azoxyanisole, 4-n-pentyl-4'-cyanobiphenyl, 4-n-octyloxy-4'-cyanobiphenyl, and trans-4-heptyl-(4-cyanophenyl) cyclohexane.

Examples of a low-molecular cholestic liquid crystal include cholesteryl-nonanate; hexalkanoyl oxybenzene; tetraalkanoyl oxy-p-benzoquinone; hexalkoxy triphenylene; hexalkanoyl oxytriphenylene; hexalkanoyl oxytoluxen; hexalkanoyl rufigallol; 2,2',6,6'-tetraryl-4,4'-bipyranilidene; 2,2',6,6'-tetraryl-4,4'-bithiopyranilidene; and the substituted benzoate of hexahydrotriphenylene.

Examples of a low-molecular smectic liquid crystal include butyloxybenzylidene-octylaniline and p-cyanobenzylidene-p'-n-octyloxyaniline.

A low-molecular discotic liquid crystal is triphenylene-hexa-n-dodecanonate or the like.

Examples of a low-molecular ferroelectric liquid crystal include an azomethyne (Schiff type), an azoxy type, an ester type, a mixture consisting of chiral compounds, and an achiral host liquid crystal doped with a chiral compound.

Mentioned as examples of a high-molecular liquid crystal are poly-γ-benzyl-L-glutamate, poly(4-cyanophenyl-4'-hexyloxy benzoate methylsiloxane), poly(4-methoxyphenyl-4'-propyloxy benzoate methylsiloxane), the block copolymer of polystyrene-polyethylene oxide, hydroxypropyl cellulose, poly(p-phenylene terephthalamide), poly[(ethylene terephthalate)-co-1,4-benzoate], poly(4,4'-dimethylazoxybenzene dodecanediol), poly(oligoethylene azoxybenzoate), and poly(p-benzamide).

Each of these liquid crystal materials can be oriented in a predetermined direction by applying an electric field or magnetic field to the material or irradiating the material with light in a predetermined direction by selecting the temperature zone of the material or the concentration thereof in a solvent or by arranging the material on the surface of a base member which has been treated so as to preferentially endow the material with orientability in a predetermined axial direction (as an orientation treatment). Using such a method, the material is oriented at the stage of the preparation of the cross-linked polymer (polymer gel), thereby forming the cross-linked polymer (polymer gel) having the layered structure or columnar structure.

By way of example, a field strength in the application of the electric field should preferably be set at $10^3$ V/cm or above, more preferably at $4 \times 10^3$ V/cm or above. A field strength in the application of the magnetic field should preferably be set at 0.1 tesla [T] or above, more preferably at 1 tesla [T] or above.

In case of employing the method in which the liquid crystal is arranged on the surface of the base member subjected to the orientation treatment, concretely the polymer gel is prepared in a state where the mixture (liquid) of the starting material with an orienting agent added thereto is arranged on the base member, such as a glass substrate, whose surface has undergone the orientation treatment. Examples of a method to be adopted for treating the surface of the material of the base member include a method in which the surface of the glass substrate is caused to adsorb, for instance, lecithin, cetyltrimethylammonium bromide, a chromium-brasilate complex, octadecyl malonate, or an organic silane coupling agent such as stearyl trichlorosilane; a method in which uniform protrusions are formed on the glass substrate; a method in which silicon oxide or the like is vapor-deposited on the surface of the glass substrate in an oblique direction; and a method in which the surface of the glass substrate is rubbed. Using such a method, a property for orienting the liquid crystal vertically or aslant is bestowed on the surface of the glass substrate.

Incidentally, the molecular structure of such an orienting agent exhibiting the liquid crystallinity can remain in the cross-linked polymer material (polymer gel) obtained.

Diacetylene Compound

A diacetylene compound for an orienting agent is turned into a polymer, which is caused to function as the orienting agent. Mentioned as examples of a monomer to be polymerized are 2,4-hexadiyne-1,6-diol; diacetylene carbonate; 2,4-hexadiyne-1,6-diol-bis-phenylurethane; diphenyldiacetylene with its ortho-position or meta-position substituted; and 3,6,13,16-tetraoxyaoctadeca-8,10-diyne-1,18-diol.

When heated or irradiated with an energy radiation such as ultraviolet rays or gamma rays, the diacetylene compound monomer gives rise to a solid-phase polymerization reaction to produce a polymer single crystal which is oriented in one direction. By utilizing this property, the mixture (liquid) of that starting material of the cross-linked polymer (polymer gel), which contains the diacetylene compound monomer as the template, is heated or irradiated with the energy radiation during the cross-linking reaction. Thus, the cross-linked polymer (polymer gel) having the layered structure or columnar structure can be prepared.

Amphiphilic Compound

An amphiphilic compound has hydrophilic groups and hydrophobic groups (lipophilic groups) in its molecules like the molecules of a surface-active agent and forms a molecular aggregate (associated body) owing to an entropy effect called the "hydrophobic interactions" and involving water molecules therein, thereby behaving as a rheotropic liquid crystal. The rheotropic liquid crystal based on the ampholytic molecules assumes a hexagonal structure in which a cylindrical associated body constitutes a hexagonal system, a lamellar structure in which the bimolecular films of the ampholytic molecules are arrayed alternately with water, an inverse hexagonal structure in which alkyl chains are directed outward, or the like. Mentioned as examples of the amphiphilic compound are a fatty soap, a monoalkyl phosphate, an alginine alkylphosphate, long-chain alkylglycerylether, octaethyleneglycol monohexadecylether, octaethyleneglycol monodecylether, and lecithin. The hexagonal structure, lamellar structure and inverse hexagonal structure stated above can be selectively formed by selecting the sort and concentration of the amphiphilic compound. Such an amphiphilic compound has the merit of being less expensive as the starting template material for the preparation of the cross-linked polymer (polymer gel) having the layered structure or columnar structure.

Ion Conducting Glass with Oriented Ion Channels

Next, there will be described practicable examples of a process for producing an ion conductive member made from an ion conducting glass.

(d) By way of example, in case of forming a thin film of that $Li_2S$—$SiS_2$-based glass exemplifying a lithium ion conducting glass, to which $Li_3PO_4$ has been added and which is expressed by 0.01 $Li_3PO_4$—0.99 (0.64 $Li_2S$-0.36 $SiS_2$), the glass obtained by melting $Li_3PO_4$, $Li_2S$ and $SiS_2$ or the materials $Li_3PO_4$, $Li_2S$ and $SiS_2$ is/are used as a target, and it/they is/are deposited into a layered structure or columnar structure by a technique such as sputtering or electron beam evaporation, while a magnetic field is maintained perpendicularly to a substrate or while a negative bias voltage is maintained to the substrate, whereby lithium ion channels can be oriented in a direction perpendicular to the substrate. Thus, the thin film of the lithium ion conducting glass with a conductivity exceeding $2.5 \times 10^{-3}$ $Scm^{-1}$ can be obtained.

SECONDARY BATTERY AND ITS MEMBERS

The secondary battery of the present invention can have a configuration in which an ion conductive member having a layered structure or columnar structure, obtained as stated above, is interposed between a negative electrode and a positive electrode so that its ionic conductivity may become the highest in a direction parallel to the planes of the negative and positive electrodes, more desirably in a direction perpendicular thereto. The secondary battery of the present invention can be fabricated in such a way that the ion conductive member, formed with ion conducting paths (ion channels) along which the migrating distances of ions substantially become the shortest in a direction parallel to the layered or columnar structure prepared as explained above or in a direction perpendicular to the layered structure, is disposed in the state in which it lies in contact with the negative electrode and positive electrode, that output terminals are led out of the negative and positive electrodes, and that the whole structure is enclosed with a sheathing material.

Practicable examples of a method of fabricating a secondary battery include the following:

(e) An ion conductive member is formed on the surface of a negative electrode or that of a positive electrode or on the surface of each of the negative and positive electrodes by any of the above processes (a) to (d). Subsequently, the negative and positive electrodes are brought into close contact so that the surface provided with the ion conductive member may be an opposing surface. Alternatively, the negative and positive electrodes are brought into close contact after a similar ionically conductive structure (film) is further sandwiched between the negative and positive electrodes. Then, a secondary battery (cell) is fabricated.

(f) A negative electrode and a positive electrode are opposed through an interspace (gap) which prevents the negative and positive electrodes from coming into direct contact. By way of example, the negative and positive electrodes are opposed through a spacer which is made of nonwoven fabric, a porous film, grains, or the like. Subsequently, an ion conductive member is formed in the interspace (gap) between the positive and negative electrodes by, for example, any of the above processes (a) to (c). Then, a secondary battery is fabricated.

(g) The surface of a collector is overlaid with a negative electrode, an ion conductive member, a positive electrode and another collector in the order mentioned, or with a positive electrode, an ion conductive member, a negative electrode and another collector in the order mentioned, by a vapor deposition technique such as sputtering or electron beam evaporation. Then, a secondary battery is fabricated.

Now, members for use in the fabrication of a secondary battery will be explained in detail.

Ion Conductive Member/Polymer Gel

In a case where the polymer gel of a cross-linked polymer as explained before is employed as the matrix of an ion conductive member, it is held in a swollen state by absorbing a solvent or a polymer which has a three-dimensional network structure insoluble in a solvent, such as a cross-linked structure. The polymer gel in which the solvent is water is called a "hydrogel", while the polymer gel in which the solvent is an organic substance is called an "organogel". In a case where an ion conductive member made from the polymer gel is adopted for a lithium secondary battery utilizing the oxidizing and reducing reactions of lithium ions, the organogel is used as the polymer gel, and in a case where it is adopted for another alkaline battery or a lead battery, the hydrogel is used.

Negative Electrode (604 Shown in FIG. 6)

A negative electrode is constituted by a collector (606 in FIG. 6) and an active material layer (605 in FIG. 6). By the way, in the present invention, an expression "active material" is a general term for substances which pertain to the electrochemical reactions of charge and discharge in a battery (the repetition of the reactions).

In a case where the secondary battery of the present invention is a lithium secondary battery utilizing the oxidation and reduction of lithium ions, a material for the active material layer of the negative electrode is a substance adapted to carry lithium during charge, such as lithium metal, a metal which is electrochemically alloyed with lithium, or a carbonaceous material or a transition metal compound which intercalates lithium. Mentioned as examples of the transition metal compound are a transition metal oxide, a transition metal nitride, a transition metal sulfide, and a transition metal carbide. Examples of the transition metal element of the transition metal compound for the negative electrode active material of the lithium secondary battery are Sc, Y, a lanthanoid, an actinoid, Ti, Zr, Hf, V, Nb, Ta, Cr, Mo, W, Mn, Tc, Re, Fe, Ru, Os, Co, Rh, Ir, Ni, Pd, Pt, Cu, Ag and Au, each of which is an element partially having a d-shell or f-shell. Especially, Ti, V, Cr, Mn, Fe, Co, Ni and Cu, which are the first transition series metals, are appropriately used.

In a case where the secondary battery of the present invention is incarnated in any of the forms of a nickel-hydride battery, a nickel-cadmium battery, a nickel-zinc battery and a lead battery in each of which an aqueous solution is employed as an electrolyte solution, a hydrogen-occlusion alloy, cadmium, zinc and lead are respectively used as the materials for the active material layers of the negative electrodes.

When the active material of the negative electrode is in the shape of a foil or a sheet or plate, it can be used as it is. When the active material is powdery, the negative electrode is fabricated by mixing a binder into the powdery material and sometimes adding an electric conduction assistant and then forming a coating film on a collector. Besides, plating or vapor deposition can be employed as a process for forming the thin film of the above material on the collector. A process for the vapor deposition may be CVD (chemical vapor deposition), electron beam evaporation, sputtering, or the like. Any negative electrode for the lithium secondary battery needs to be sufficiently dried under a reduced pressure.

The collector of the negative electrode in the present invention functions to efficiently supply current which is dissipated by the electrode reactions during charge and discharge or to collect current which is generated. Accordingly, a material to form the collector of the negative electrode should desirably be a material whose electric conductivity is high and which is inactive to the battery reactions. Mentioned as the preferable materials are nickel, titanium, copper, aluminum, stainless steel, platinum, palladium, gold, zinc, various alloys, and a metal composition including at least two of the above materials. The collector can be adopted in any of the shapes or states of, for example, a sheet or plate, a foil, meshes, sponge, fiber, a punched metal material and an expanded metal material.

Positive Electrode (607 Shown in FIG. 6)

A positive electrode is constituted by a collector (609 in the example shown in FIG. 6) and an active material layer (608 in the same).

In a case where the secondary battery of the present invention is a lithium secondary battery utilizing the oxidation and reduction of lithium ions, a material for the active material layer of the positive electrode is a transition metal compound which is adapted to carry lithium during discharge and which intercalates lithium, such as a transition metal oxide, a transition metal nitride or a transition metal sulfide. Examples of the transition metal element of the transition metal compound for the positive electrode active material of the lithium secondary battery are Sc, Y, a lanthanoid, an actinoid, Ti, Zr, Hf, V, Nb, Ta, Cr, Mo, W, Mn, Tc, Re, Fe, Ru, Os, Co, Rh, Ir, Ni, Pd, Pt, Cu, Ag and Au, each of which is an element partially having a d-shell or f-shell. Especially, Ti, V, Cr, Mn, Fe, Co, Ni and Cu, which are the first transition series metals, are appropriately used.

In a case where the secondary battery of the present invention is incarnated in any of the forms of a nickel-hydride battery, a nickel-cadmium battery and a nickel-zinc battery in each of which an aqueous solution is employed as an electrolyte solution, nickel hydroxide is used as the material for the active material layer of the positive electrode. In case of a lead battery, lead oxide is used for the active material layer of the positive electrode.

The positive electrode in the present invention may include the collector, the positive electrode active material, an electric conduction assistant, a binder, etc. This positive electrode is fabricated in such a way that a mixture consisting of the positive electrode active material, the electric conduction assistant, the binder, etc. are molded on the surface of the collector.

Mentioned as examples of the electric conduction assistant for the positive electrode are graphite, carbon black such as ketjen black or acetylene black, and the fine powder of a metal such as nickel. The binder for the positive electrode is, for example, a polyolefin resin such as polyethylene or polypropylene, or a fluorine resin such as polyvinylidene fluoride or tetrafluoroethylene polymer, in case of a water-insoluble type electrolyte solution, and polyvinyl alcohol, cellulose or a polyamide in case of a water-soluble type electrolyte solution.

The collector of the positive electrode functions to efficiently supply current which is dissipated by the electrode reactions during charge and discharge or to collect current which is generated. Accordingly, a material to form the collector of the positive electrode should desirably be a material whose electric conductivity is high and which is inactive to the battery reactions. Mentioned as the preferable materials are nickel, titanium, aluminum, stainless steel, platinum, palladium, gold, zinc, various alloys, and a metal composition including at least two of the above materials. The collector can be adopted in any of the shapes or states of, for example, a sheet or plate, a foil, meshes, sponge, fiber, a punched metal material and an expanded metal material.

Electrolyte Solution

In a case where the secondary battery of the present invention is applied to a lithium secondary battery utilizing the oxidizing and reducing reactions of lithium ions, materials to be explained below are appropriately employed as a supporting electrolyte for an electrolyte solution which is carried in an ion conductive member and a solvent for the supporting electrolyte.

Mentioned as examples of the material of the supporting electrolyte are acids such as $H_2SO_4$, HCl or $HNO_3$; salts which consist of lithium ions ($Li^+$) and Lewis acid ions ($BF_4^-$, $PF_6^-$, $AsF_6^-$, $ClO_4^-$, $CF_3SO_3^-$ or $BPh_4^-$ (Ph:phenyl group); and mixed salts which consist of such salts. Also usable are salts which consist of Lewis acid ions and cations such as sodium ions, potassium ions or tetralkylammonium ions. The above salts should desirably be sufficiently dehydrated and deoxidized beforehand by heating under a reduced pressure.

Usable as the solvent of the supporting electrolyte is, for example, acetonitrile; benzonitrile; propylene carbonate; ethylene carbonate; dimethyl carbonate; diethyl carbonate; dimethyl formaldehyde; tetrahydrofuran; nitrobenzene; dichloroethane; diethoxyethane; 1,2-dimethoxyethane; chlorobenzen; γ-butyrolactone; dioxolane; sulfolane; nitromethane; dimethyl sulfide; dimethyl sulfoxide; dimethoxyethane; methyl formate; 3-methyl-2-oxazolidinone; 2-methyltetrahydrofuran; 3-propylsydnone; sulfur dioxide; phosphoryl chloride; thionyl chloride; sulfuryl chloride; or a mixed solution consisting of them.

The above solvent is dehydrated with or by, for example, active alumina, a molecular sieve, phosphorus pentoxide, or calcium chloride. Some of the solvents should preferably be distilled in the presence of an alkaline metal within an inert gas so as to remove impurities and to be dehydrated.

In a case where the secondary battery of the present invention is applied to any secondary battery other than the lithium secondary battery and where the solvent for the electrolyte solution to be carried in the ion conductive member is water, a material to be explained below is appropriately employed as the supporting electrolyte. In any of the cases of the nickel-hydride battery, nickel-cadmium battery, nickel-zinc battery and air-zinc battery, an alkaline substance such as potassium hydroxide, lithium hydroxide or sodium hydroxide is employed. In the case of the lead battery, an acid such as sulfuric acid is employed.

Shape and Structure of Battery

The concrete shape of the secondary battery of the present invention is any of, for example, a flat shape, a cylindrical shape, a rectangular-parallelepiped shape, and a sheet shape. On the other hand, the structure of the battery is any of, for example, a single-layer type, a multilayer type and a spiral type. Among all, the spiral type cylindrical battery can enlarge its electrode area when wound with a separator interposed between a negative electrode and a positive electrode to bring forth the feature that larger currents can be caused to flow during charge and discharge. Besides, the battery in the shape of a rectangular-parallelepiped shape or a sheet has the feature that the accommodation space of an apparatus, which needs to accommodate a plurality of batteries, can be effectively utilized.

Since an electrolyte solution can be solidified between the negative electrode and the positive electrode by employing the ion conductive member of the present invention, leakage of the liquid does not take place, and the enclosure of the battery is facilitated. It is, therefore, possible to decrease the thickness of the sheathing material of the battery, and to readily fabricate the battery of optional shape.

Examples of the shape and structure of the battery will now be described in more detail with reference to FIG. 7. This figure illustrates a sectional view of a single-layer type flat (coin-shaped) battery. Such a secondary battery has a configuration which is basically the same as in FIG. 6, and which includes a negative electrode, a positive electrode, an ion conductive member containing an electrolyte, a battery housing and output terminals.

Figure 7:
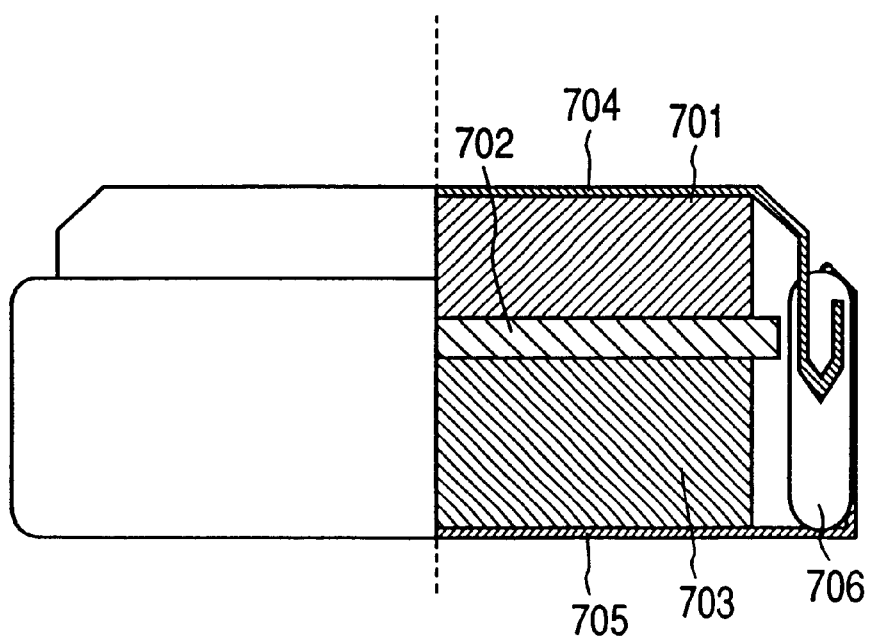
FIG. 7 is a sectional view showing an-aspect of a cylindrical battery of the present invention.

Referring to FIG. 7, numeral 701 designates a negative electrode, numeral 703 a positive electrode, numeral 704 a negative electrode terminal (negative electrode cap), numeral 705 a positive electrode terminal (positive electrode can), numeral 702 an ion conductive member, and numeral 706 a gasket.

In the flat (coin-shaped) secondary battery shown in FIG. 7, the positive electrode 703 including a positive electrode material layer (active material layer) and the negative electrode 701 including a negative electrode material layer (active material layer) are laminated through, at least, the ion conductive member 702. The resulting laminated body is received from the positive electrode side of the battery into the positive electrode can 705 serving as the positive electrode terminal, and the negative electrode side of the battery is concealed by the negative electrode cap 704 serving as the negative electrode terminal. The gasket 706 is arranged in the remaining inner part of the positive electrode can 705.

An example of a method of assembling the battery shown in FIG. 7 will be explained below.

(1) The laminated body, in which the ion conductive member (702) is sandwiched between the negative electrode (701) and the positive electrode (703), is formed by a method as stated before, and it is assembled into the positive electrode can (705).

(2) The negative electrode cap (704) and the gasket (706) are assembled together.

(3) The assembly obtained at the above step (2) is caulked. Then, the battery is finished.

Incidentally, the preparations of the materials of the lithium battery and the assemblage of the battery as thus far explained should desirably be performed in dry air or a dry inert gas from which moisture has been satisfactorily removed.

There will be explained other members which constitute the secondary battery as stated above.

Insulating Packing

Usable as the material of the gasket (706) is, for example, a fluorine resin, a polyolefin resin, a polyamide resin, a polysulfone resin, or any of various sorts of rubber. The battery may be sealed by the "caulking" method employing an insulating packing as illustrated in FIG. 7 and may well be sealed by a method or member such as a sealed glass tube, adhesives, welding or soldering. Besides, any of various organic resin materials and ceramics is used as the material of an insulating plate in FIG. 7.

Battery Housing

A battery housing for accommodating constituent members in a secondary battery is configured of the positive electrode can (705) and the negative electrode cap (704) of the battery in the example shown in FIG. 7. Since the positive electrode can (705) and the negative electrode cap (704) serve also as the battery housing (case) and output/input terminals in the example shown in FIG. 7, stainless steel is preferably employed therefor.

By the way, in a case where the positive electrode can (705) and the negative electrode cap (704) do not serve also as the housing, the sheathing material of the battery is appropriately formed as a plastic member in the shape of a sheet or plate or a film, a composite member of plastic and metal such as a layer film in which a metal foil or evaporated metal film is covered with plastic film, or the like. In the case where the secondary battery of the present invention is the lithium secondary battery, the sheathing material should more preferably be a material through which water vapor and gases do not permeate, and it is essential to seal the battery proper by closing up any path of invasion of water vapor.

Now, the present invention will be described in detail on the basis of examples. It is to be understood, however, that the present invention is not restricted to the examples.

In the ensuing description, the expressions "parts" and "%" shall be based on weights unless otherwise specified.

Preparation of Polymer Gel Electrolyte/Ion Conductive Member

Experiment 1

First, the reaction vessel of a three-necked flask furnished with a circulating device, a dropping device, an agitating device and a heating device was filled up with dried nitrogen gas. 15.0 parts of polyoxyethylene hexadecylether being a nonionic surfactant, which was employed as a compound having a molecular structure to serve as a template, and 275 parts of ion-exchanged water, were put into the three-necked flask and were agitated. Subsequently, 8.76 parts of diethyleneglycol monomethylether methacrylate and 0.24 part of ethyleneglycol dimethacrylate were agitated well and were dropped into the three-necked flask using the dropping device, and the resulting system was agitated well until it became uniform. Further, an aqueous solution in which 0.03 part of potassium peroxosulfate was dissolved in 10 parts of ion-exchanged water was dropped as a polymerization initiator into the three-necked flask using the dropping device. Polymerization was performed at 75° C. for 7 hours while the interior of the three-necked flask was being agitated. Thereafter, a granular polymer gel obtained was washed with water and ethanol and was dried. Then, a powdery cross-linked polymer was obtained.

The ethylenecarbonate-propylenecarbonate (1:1) solution of 1 mol/liter of lithium tetrafluoroborate was added by 80 parts to 20 parts of the powdery cross-linked polymer obtained, whereby a paste was prepared. The paste was applied onto a glass substrate coated with indium-tin oxide (ITO) to a thickness of 50 microns. Thus, an ion conductive member containing a polymer gel electrolyte was manufactured.

Figure 8:
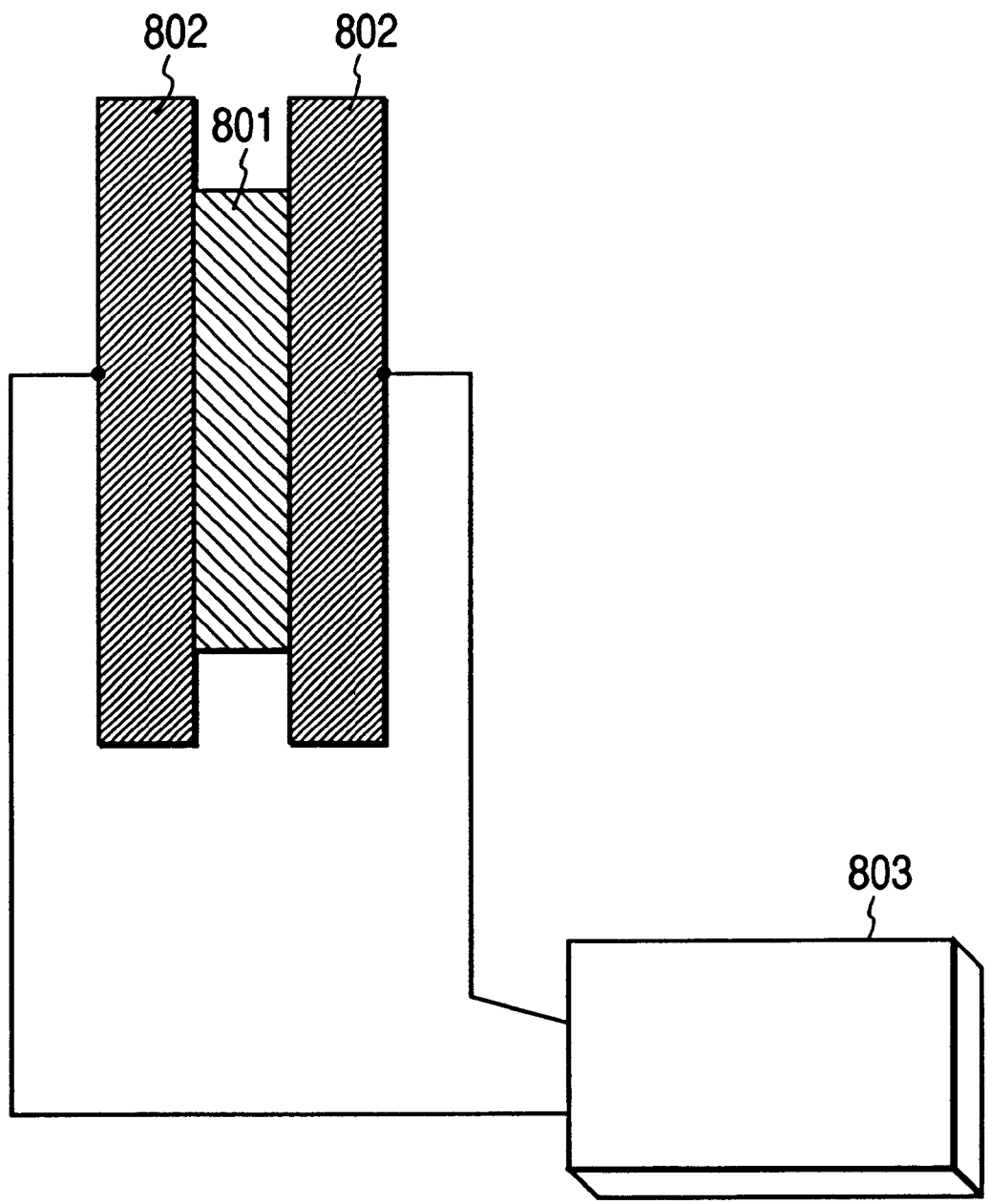
FIG. 8 is a schematic view showing a system which serves to measure the impedance of an ion conductive member in an embodiment.

The ion conductive member was sandwiched between the above glass substrate and another ITO-coated glass substrate, and the resulting structure was connected as illustrated in FIG. 8. The impedance of the ion conductive member 801 of the polymer gel electrolyte between the pair of ITO electrodes 802 was measured with a measurement signal of 1 kilohertz by the use of an impedance measurement device 803 constructed of a milliohmmeter. Then, the resistance $\underline{r}$ of the ion conductive member 801 was found. Further, the thickness $\underline{d}$ and area A of the structure 801 were measured. The ionic conductivity of the gel was calculated in accordance with an equation (Ionic conductivity $\sigma$)=$d/(A \times r)$.

Besides, when the polymer gel electrolyte obtained was observed under crossed nicols polarization by the use of a polarizing microscope, a structure in which layered polymer skeletons were arrayed was seen.

Comparative Experiment 1

As in Experiment 1 explained above, the reaction vessel of a three-necked flask furnished with a circulating device, a dropping device, an agitating device and a heating device was first filled up with dried nitrogen gas. 290 parts of ion-exchanged water were put into the three-necked flask and were agitated. Subsequently, 8.76 parts of diethyleneglycol monomethylether methacrylate and 0.24 part of ethyleneglycol dimethacrylate were agitated well and were dropped into the three-necked flask using the dropping device, and the resulting system was agitated well until it became uniform. Further, an aqueous solution in which 0.03 part of potassium peroxosulfate was dissolved in 10 parts of ion-exchanged water was dropped as a polymerization initiator into the three-necked flask using the dropping device. Polymerization was performed at 75° C. for 7 hours while the interior of the three-necked flask was being agitated. A granular polymer gel thus obtained was washed with water and ethanol and was-dried. Then, a powdery cross-linked polymer was obtained.

The ethylenecarbonate-propylenecarbonate (1:1) solution of 1 mol/liter of lithium tetrafluoroborate was added by 80 parts to 20 parts of the powdery cross-linked polymer obtained, whereby a paste was prepared. The paste was applied onto a glass substrate coated with indium-tin oxide (ITO) to a thickness of 50 microns. Thus, an ion conductive member containing a polymer gel electrolyte was manufactured. The ion conductive member was sandwiched between the above glass substrate and another ITO-coated glass substrate. As in Experiment 1, the resistance of the polymer gel electrolyte between the ITO electrodes was measured by an impedance measurement which was based on a measurement signal of 1 kilohertz and which used a milliohmmeter. The ionic conductivity of the gel calculated from the measurement of the resistance was a value which was about ⅓ of that of Experiment 1.

Besides, when the gel electrolyte obtained by the above process was observed under crossed nicols polarization by the use of a polarizing microscope, an oriented structure as in Experiment 1 was not seen in a dark field.

Experiment 2

There were mixed 29.8 parts of methyl methacrylate as a monomer, 0.2 part of ethyleneglycol dimethacrylate as a cross-linking agent, 50 parts of N-(4-ethoxybenzylidene-4'-butylaniline) being a low-molecular liquid crystal as a compound having a molecular structure to serve as a template, and 1 part of 2,2'-azobisisobutyronitrile as an initiator, and 20 parts of propylene carbonate was added to the mixed solution. The resulting mixed solution was inserted into a cell which was constituted by two ITO-coated glass substrates and which had a cell gap of 100 microns, and an AC electric field of 100 V (at 400 Hz) was applied between the ITO electrodes. Subsequently, the cell was heated at 75° C. at which the liquid crystal exhibited a nematic state, while the electric field was maintained, whereby a polymerizing reaction and a cross-linking reaction were induced. Then, a film polymer gel was obtained.

After the low-molecular liquid crystal in the polymer gel obtained was washed and removed with ethyl alcohol, the polymer gel was impregnated with an electrolyte solution of 1 mol/liter in which lithium tetrafluoroborate was dissolved in propylene carbonate, so as to carry the electrolyte solution. Then, a polymer gel electrolyte was prepared.

Figure 10:
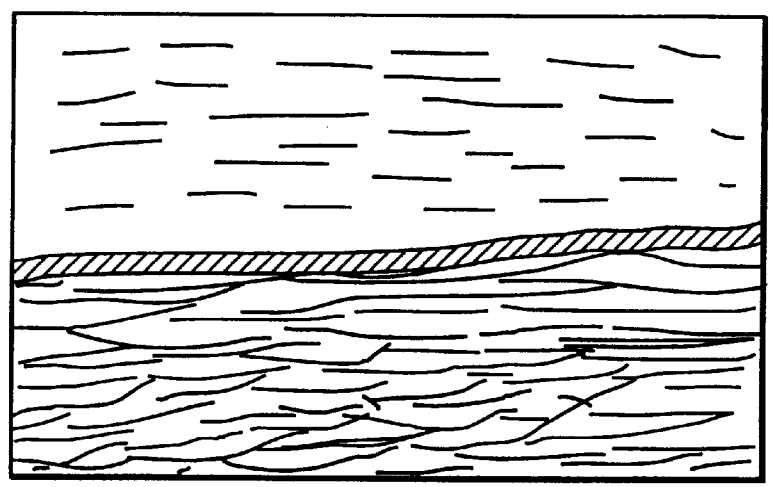
FIG. 10 is a schematic view showing an image which was obtained when an ion conductive member (a polymer gel electrolyte) in Experiment 2 was observed with an electron microscope.

As in Experiment 1, the resistance of the polymer gel electrolyte was measured by an impedance measurement employing a milliohmmeter, and the ionic conductivity thereof was calculated from the thickness thereof. Also, the polymer gel electrolyte obtained was observed with a field emission type scanning electron microscope. FIG. 10 is a schematic view showing an image which was observed at an acceleration voltage of 20.0 kV. The upper part of the figure corresponds to the surface part of the polymer gel electrolyte, and the lower part to the interior (sectional part) of the electrolyte. It is understood from the image part of the interior that the polymer gel is formed as layers or a lamination. The layered direction of the layers was perpendicular to the direction of the electric field applied during the preparation (the direction of the vector of the electric line of force).

Comparative Experiment 2

A polymer gel electrolyte was prepared in the same way as in Experiment 2, except that propylene carbonate was added instead of the low-molecular liquid crystal N-(4-ethoxybenzylidene-4'-butylaniline) used in Experiment 2. As in Experiment 2, the resistance of the polymer gel electrolyte was measured by an impedance measurement employing a milliohmmeter, and the ionic conductivity thereof was calculated from the thickness thereof. Then, the ionic conductivity was about ⅕ of that exhibited in Experiment 2.

Besides, when the configuration of the polymer gel electrolyte obtained was observed with an electron microscope, the layered structure as shown in FIG. 10 in which the electrolyte was regularly oriented perpendicularly to the electric field applied during the preparation (the vector of the electric line of force) was not seen.

Experiment 3

There were mixed 50 parts of methyl methacrylate as a monomer, 5 parts of ethyleneglycol dimethacrylate as a cross-linking agent, 40 parts of N-(4-ethoxybenzylidene-4'-butylaniline) being a low-molecular liquid crystal as a compound having a molecular structure to serve as a template, and 5 parts of 2,2'-azobisisobutyronitrile as an initiator, and the 1,4-dioxane solution of 0.5 mol/liter of lithium tetrafluoroborate was added by 200 parts to the mixed solution. The resulting mixed solution was inserted into a cell which was constituted by two glass substrates with their surfaces coated with lecithin beforehand and which had a cell gap of 50 microns. The resulting gapped cell was sandwiched between the N-pole and S-pole of a samarium-cobalt anisotropic magnet having a residual flux density of 1 tesla, whereby a magnetic field was applied to the mixed solution. Subsequently, the cell was heated at 75° C. at which the low-molecular liquid crystal exhibited a nematic state, whereby a polymerizing reaction and a cross-linking reaction were induced. Then, a film polymer gel was obtained.

After the low-molecular liquid crystal in the polymer gel obtained was washed and removed with acetone, the polymer gel was impregnated with an electrolyte solution of 1 mol/liter in which lithium tetrafluoroborate was dissolved in propylene carbonate, so as to carry the electrolyte solution. Then, a polymer gel electrolyte was prepared.

As in Experiment 1, the resistance of the polymer gel electrolyte was measured by an impedance measurement employing a milliohmmeter, and the ionic conductivity thereof was calculated from the thickness thereof. When the configuration of the polymer gel electrolyte obtained was observed with an electron microscope, a sectional structure having a columnar structure in which the electrolyte was regularly oriented in parallel with the applied magnetic field (with the vector of the magnetic line of force) was seen.

Comparative Experiment 3

A polymer gel electrolyte was prepared in the same way as in Experiment 3, except that propylene carbonate was added instead of the low-molecular liquid crystal N-(4-ethoxybenzylidene-4'-butylaniline) used in Experiment 3.

As in Experiment 3, the resistance of the polymer gel electrolyte was measured by an impedance measurement employing a milliohmmeter, and the ionic conductivity thereof was calculated from the thickness thereof. Then, the ionic conductivity was about ¼ of that exhibited in Experiment 3.

Besides, when the configuration of the polymer gel electrolyte obtained was observed with an electron microscope, the columnar structure in which the electrolyte was regularly oriented in parallel with the applied magnetic field was not seen.

Experiment 4

There were mixed 45 parts of methyl methacrylate as a monomer, 5 parts of ethyleneglycol dimethacrylate as a cross-linking agent, 40 parts of N-(4-ethoxybenzylidene-4'-butylaniline) being a low-molecular liquid crystal as a compound having a molecular structure to serve as a template, 9 parts of the propylene carbonate solution of 1 mol/liter of lithium tetrafluoroborate, and 1 part of 2,2'-azobisisobutyronitrile as an initiator. A pair of electrodes made of SUS (stainless steel) were inserted into the resulting mixed solution, an AC electric field 2 V (at 400 Hz) was applied between the electrodes, and the mixed solution was heated at 75° C. at which the liquid crystal exhibited a nematic state, whereby a polymerizing reaction and a cross-linking reaction were induced. Then, a polymer gel was obtained.

After the low-molecular liquid crystal in the polymer gel obtained was subsequently washed and removed with acetone, the polymer gel was impregnated with an electrolyte solution of 1 mol/liter in which lithium tetrafluoroborate was dissolved in propylene carbonate, so as to carry the electrolyte solution. Then, a polymer gel electrolyte was prepared.

As in Experiment 1, the resistance of the polymer gel electrolyte was measured by an impedance measurement employing a milliohmmeter, and the ionic conductivity thereof was calculated from the thickness thereof. Also, the polymer gel electrolyte obtained was observed with a field emission type scanning electron microscope. FIGS. 11A, 11AP and 11B are schematic views each showing an image which was observed at an acceleration voltage of 20.0 kV. FIG. 11A illustrates the state of the surface of the polymer gel electrolyte obtained, while FIG. 11B illustrates the interior (sectional view) of the electrolyte. The surface of the polymer gel electrolyte included domains of various shapes as shown in FIG. 11A, and each of the individual domains consisted of mosaic subdomains as shown in FIG. 11AP. Besides, in the interior (sectional view) shown in FIG. 11B, the polymer gel electrolyte was formed to be columnar. The direction of growth of columns shown in FIG. 11B was parallel to that of the electric field applied during the preparation.

Comparative Experiment 4

A polymer gel electrolyte was prepared in the same way as in Experiment 4, except that propylene carbonate was added instead of the low-molecular liquid crystal N-(4-ethoxybenzylidene-4'-butylaniline) used in Experiment 4.

As in Experiment 4, the resistance of the polymer gel electrolyte was measured by an impedance measurement employing a milliohmmeter, and the ionic conductivity thereof was calculated from the thickness thereof. Then, the ionic conductivity was about ⅙ of that exhibited in Experiment 4.

Besides, when the polymer gel electrolyte obtained was observed with an electron microscope, the columnar structure as shown in FIG. 11B in which the columns were grown in parallel with the applied electric field (the vector of the electric line of force) was not seen.

Experiment 5

25 parts of sodium dodecylsulfonate being an anionic surfactant for forming a layered structure, and 100 parts of ion-exchanged water were mixed and agitated. Subsequently, 16.5 parts of acrylonitrile and 1.5 part of ethyleneglycol dimethacrylate were agitated well, and argon gas was bubbled in the resulting mixed solution so as to be substituted for oxygen. Further, 1.5 part of 1-hydroxy-cyclohexyl-phenyl-ketone was mixed as a photo-polymerization initiator. Then, a mixed solution was prepared. Thereafter, the mixed solution obtained was cast onto a glass substrate coated with indium-tin oxide (ITO), and it was irradiated with light by a high-pressure mercury-arc lamp of 500 watts, whereby polymerizing and cross-linking reactions were induced. Then, a polymer film was obtained. Subsequently, the polymer film formed on the glass substrate was repeatedly immersed in fresh methanol until the surfactant was removed. Next, the resulting polymer film was caused to absorb the propylene carbonate solution of 1 mol/liter of lithium tetrafluoroborate. Thus, an ion conductive member was manufactured.

The ion conductive member was sandwiched between the above glass substrate and another ITO-coated glass substrate, the resulting structure was connected as illustrated in FIG. 8, and the ionic conductivity of the ion conductive member was measured by a milliohmmeter in the same way as in Experiment 1. Besides, when the ion conductive member of the polymer gel electrolyte film obtained was observed with an electron microscope, the layered structure was seen.

Comparative Experiment 5

After the monomer and the cross-linking agent were polymerized and cross-linked without adding the surfactant in Experiment 5, the processing steps of Experiment 5 were conformed to. Then, a polymer film was obtained on a glass substrate coated with indium-tin oxide (ITO). Subsequently, the polymer film formed on the glass substrate was repeatedly immersed in fresh methanol to wash. Next, the resulting polymer film was caused to absorb the propylene carbonate solution of 1 mol/liter of lithium tetrafluoroborate. Thus, an ion conductive member was manufactured.

As in Experiment 5, the resistance of the polymer film was measured by an impedance measurement employing a milliohmmeter, and the ionic conductivity thereof was calculated from the thickness thereof. Then, the ionic conductivity was about ¼ of that exhibited in Experiment 5.

Besides, the ion conductive member of the polymer gel electrolyte film obtained was observed with an electron microscope, but the layered structure as exhibited in Experiment 5 was not seen.

Experiment 6

There were mixed 90 parts of methyl methacrylate as a monomer, 10 parts of 4-(6-acryloyloxyhexyloxy)-4'-cianobiphenyl as a liquid crystalline monomer, 5 parts of bisphenol-A diacrylate resembling a structure exhibitive of liquid crystallinity and serving as a cross-linking agent, and 5 parts of 2,2'-azobisisobutyronitrile as an initiator, and propylene carbonate was added by 100 parts to the mixed solution. The resulting mixed solution was inserted into a cell which was constituted by two ITO-coated glass substrates and which had a cell gap of 50 microns, and an AC electric field of 100 V (at 400 Hz) was applied between the ITO electrodes. Subsequently, the cell was heated at 70° C. with the electric field maintained, whereby a polymerizing reaction and a cross-linking reaction were induced. Then, a film polymer gel was obtained. After the low-molecular liquid crystal in the polymer gel obtained was washed and removed with tetrahydrofuran, the resulting polymer gel was caused to absorb an electrolyte of 1 mol/liter in which lithium tetrafluoroborate was dissolved in propylene carbonate. Thus, an ion conductive member of the polymer gel electrolyte was manufactured.

As in Experiment 1, the resistance of the ion conductive member was measured by an impedance measurement employing a milliohmmeter, and the ionic conductivity thereof was calculated from the thickness thereof. Besides, when the configuration of the polymer gel electrolyte obtained was observed with an electron microscope, a sectional structure in which a layered structure perpendicular to the applied electric field was oriented was seen.

Comparative Experiment 6

In Experiment 6, methyl methacrylate was added as a liquid crystalline monomer instead of 4-(6-acryloyloxyhexyloxy)-4'-cyanobiphenyl, and ethyleneglycol dimethacrylate was added as a cross-linking agent instead of bisphenol-A diacrylate exhibitive of liquid crystallinity. As in Experiment 6, a cell was heated at 70° C. to induce a polymerizing reaction and a cross-linking reaction. Thus, a film polymer gel was obtained. After the polymer gel obtained was washed with tetrahydrofuran to remove the low-molecular liquid crystal, it was impregnated with an electrolyte solution of 1 mol/liter in which lithium tetrafluoroborate was dissolved in propylene carbonate, so as to carry the electrolyte solution. Then, an ion conductive member containing the polymer gel electrolyte was prepared.

As in Experiment 1, the resistance of the polymer gel electrolyte was measured by an impedance measurement employing a milliohmmeter, and the ionic conductivity thereof was calculated from the thickness thereof. The ionic conductivity was about ⅓ of that exhibited in Experiment 6.

Also, when the configuration of the polymer gel electrolyte obtained was observed with an electron microscope, the layered structure perpendicular to the applied electric field was not seen.

Experiment 7

1.7 part of triethylene tetramine and 3.6 parts of lithium tetrafluoroborate were mixed into 20 parts of poly(γ-benzyl-L-glutamate) being a polymer exhibitive of liquid crystallinity and 80 parts of 1,4-dioxane. The resulting mixed solution was inserted into a cell which was constituted by two sheets of tetrafluoroethylene polymer and which had a cell gap of 50 microns. The resulting gapped cell was sandwiched between the N-pole and S-pole of a samarium-cobalt anisotropic magnet having a residual flux density of 1 tesla, whereby a magnetic field was applied to the mixed solution. Subsequently, the cell was let to stand at 75° C. for 7 days. Then, a polymer gel film was obtained. Further, the obtained film was washed with 1,4-dioxane, and it was impregnated with an electrolyte solution of 0.5 mol/liter in which lithium tetrafluoroborate was dissolved in 1,4-dioxane, so as to carry the electrolyte solution. Then, a film polymer gel electrolyte was obtained.

When the configuration of the polymer gel electrolyte obtained was observed with an electron microscope, a sectional structure in which a regular columnar structure was oriented in parallel with the applied magnetic field (with the vector of the magnetic line of force) was seen.

Comparative Experiment 7

A polymer gel film was prepared in the same way as in Experiment 7, except that the polymer poly(γ-benzyl-L-glutamate) exhibitive of liquid crystallinity used in Experiment 7 was replaced with poly(methyl methacrylate). Further, a polymer gel electrolyte was prepared in the same way as in Experiment 7. Subsequently, as in Experiment 7, the resistance of the polymer gel electrolyte was measured by an impedance measurement employing a milliohmmeter, and the ionic conductivity thereof was calculated from the thickness thereof. Then, the ionic conductivity was about ¼ of that exhibited in Experiment 7.

Also, when the configuration of the polymer gel electrolyte obtained was observed with an electron microscope, the sectional structure in which the regular columnar structure was oriented in parallel with the applied magnetic field was not seen.

Experiment 8

In a mixed solution consisting of 30 parts of potassium palmitate as a surfactant and 70 parts of ion-exchanged water, nitrogen gas was bubbled for gas substitution. Next, 8.76 parts of ethyleneglycol monomethylether methacrylate as well as 0.24 part of ethyleneglycol dimethacrylate, and 0.03 part of potassium peroxosulfate as a polymerization initiator were added and agitated to prepare a mixed solution. Thereafter, the mixed solution obtained was cast onto a glass substrate coated with indium-tin oxide (ITO), and it was heated to 75° C., whereby polymerizing and cross-linking reactions were induced. Then, a polymer film was obtained. Subsequently, the polymer film formed on the glass substrate was repeatedly immersed in fresh methanol until the surfactant was removed. Next, the resulting polymer film was caused to absorb the propylene carbonate solution of 1 mol/liter of lithium tetrafluoroborate. Thus, an ion conductive member was manufactured.

The ion conductive member was sandwiched between the above glass substrate and another ITO-coated glass substrate, the resulting structure was connected as illustrated in FIG. 8, and the ionic conductivity of the ion conductive member was measured by a milliohmmeter in the same way as in Experiment 1.

Besides, when the ion conductive member of the polymer gel electrolyte film obtained was observed with an electron microscope, a columnar structure was seen.

Comparative Experiment 8

The processing steps of Experiment 8 were conformed to except that the surfactant in Experiment 8 was not used and that a cross-linking reaction was induced by irradiation with light. Thus, a polymer gel film was prepared on an ITO-coated glass substrate. The polymer gel was sandwiched between the above glass substrate and another ITO-coated glass substrate. As in Experiment 1, an impedance measurement was performed, and the ionic conductivity of the polymer gel film was calculated from the thickness thereof. Then, the ionic conductivity based on the measurement of the resistance of the film was about ½ of that exhibited in Experiment 8.

Besides, when the configuration of the polymer gel electrolyte formed by the above process was observed with an electron microscope, the regular columnar structure as exhibited in Experiment 8 was not seen.

Experiment 9

60 parts of N-(4-ethoxybenzylidene-4'-butylaniline) being a low-molecular liquid crystal, with tetrahydrofurane added thereto, was dissolved in 40 parts of polycarbonate as the matrix of a polymer, thereby forming a mixed solution. Thereafter, an electrolyte solution of 1 mol/liter in which lithium tetrafluoroborate was dissolved in propylene carbonate was mixed into the above mixed solution. Then, a paste was prepared. An ITO-coated glass substrate was coated with the paste, and it was let to stand still in a state where a magnetic field of 2 tesla was applied in a direction perpendicular to the resulting ITO-coated glass substrate by an electromagnet. Thereafter, the substrate was irradiated with an electron beam so as to induce a cross-linking reaction. Thus, a polymer gel film was prepared. Subsequently, the obtained film was washed with acetonitrile, and it was impregnated with an electrolyte solution of 1 mol/liter in which lithium tetrafluoroborate was dissolved in propylene carbonate, so as to carry the electrolyte solution. Then, a polymer gel electrolyte was prepared. The polymer gel electrolyte film obtained was sandwiched between the above glass substrate and another ITO-coated glass substrate. As in Experiment 1, an impedance measurement was performed, and the ionic conductivity of the polymer gel electrolyte film was calculated from the thickness thereof.

Besides, when the configuration of the polymer gel electrolyte obtained by the above process was observed with an electron microscope, a layered structure perpendicular to the applied magnetic field (to the vector of the magnetic line of force) was seen.

Comparative Experiment 9

In Experiment 9, tetrahydrofuran was added and dissolved into polycarbonate, without adding the low-molecular liquid crystal N-(4-ethoxybenzylidene-4'-butylaniline), thereby forming a mixed solution. Thereafter, an electrolyte solution of 1 mol/liter in which lithium tetrafluoroborate was dissolved in propylene carbonate was mixed into the above mixed solution. Then, a paste was prepared. An ITO-coated glass substrate was coated with the paste, and it was irradiated with an electron beam so as to induce a cross-linking reaction. Thus, a polymer gel film was prepared. Subsequently, the obtained film was washed with acetonitrile, and it was impregnated with an electrolyte solution of 1 mol/liter in which lithium tetrafluoroborate was dissolved in propylene carbonate, so as to carry the electrolyte solution. Then, a polymer gel electrolyte was prepared.

As in Experiment 9, an impedance measurement was performed, and the ionic conductivity of the polymer gel electrolyte film was calculated from the thickness thereof. Then, the ionic conductivity based on the measurement of the resistance of the film was about ¼ of that exhibited in Experiment 9. Besides, when the configuration of the polymer gel electrolyte obtained by the above process was observed with an electron microscope, the regular layered structure perpendicular to the applied magnetic field as seen in Experiment 9 was not seen.

Experiment 10

There were mixed 8 parts of acrylamide, 2 parts of acrylic acid, 1 part of methylene bisacrylamide, 20 parts of sodium dodecylsulfonate being an anionic surfactant, 0.4 part of 2,2'-azobisisobutyronitrile being an initiator, and 92 parts of ion-exchanged water. The resulting mixed solution was subjected to radical polymerization at 70° C. in a nitrogen atmosphere while being agitated. Then, a granular polymer gel was obtained. The gel was washed with methanol to remove the surfactant and was dried. Carboxymethyl cellulose was mixed by 5 parts to 95 parts of the granular polymer gel obtained, and a solution of 50% acetone-50% ion-exchanged water was added to the mixture, whereby a paste was prepared. The paste was applied onto an ITO-coated glass substrate and was dried. The resulting paste was impregnated with a potassium hydroxide aqueous solution of 30 weight % containing 2 weight % of lithium hydroxide. Thus, a layer of polymer gel electrolyte having a thickness of 50 microns was formed. The electrolyte layer was sandwiched between the above glass substrate and another ITO-coated glass substrate. As in Experiment 1, an impedance measurement was performed, and the ionic conductivity of the electrolyte layer was calculated from the thickness thereof.

Also, the granular polymer gel electrolyte obtained by the above process was observed with an electron microscope, and a regular layered structure was seen in the granular polymer gel.

Comparative Experiment 10

Polymer gel grains were obtained in conformity with the operations of Experiment 10, but the surfactant used in Experiment 10 was not added. Carboxymethyl cellulose was mixed by 5 parts to 95 parts of the polymer gel powder obtained, and a solution of 50% acetone-50% ion-exchanged water was added to the mixture, whereby a paste was prepared. The paste was applied onto an ITO-coated glass substrate and was dried, and it was impregnated with a potassium hydroxide aqueous solution of 30 weight % containing 2 weight % of lithium hydroxide, whereby a polymer gel layer having a thickness of 50 microns was formed as in Experiment 10. The polymer gel layer was sandwiched between the above glass substrate and another ITO-coated glass substrate, and the ionic conductivity of the layer was measured. Then, the ionic conductivity based on the measurement of the resistance of the layer was about ⅓ of that exhibited in Experiment 10.

Besides, when a granular polymer gel electrolyte obtained by the above process was observed with an electron microscope, the regular layered structure as seen in Experiment 10 was not seen in the granular polymer gel.

Experiment 11

There were mixed 5 parts of vinyl acetate, 5 parts of methyl acrylate, 0.4 part of 2,2'-azobisisobutyronitrile, 40 parts of potassium palmititate as a surfactant, and 60 parts of ion-exchanged water. The resulting mixed solution was subjected to radical polymerization at 70° C. in a nitrogen atmosphere while being agitated. Thereafter, the resulting polymer was saponified and cross-linked at 40° C. in a methanol aqueous solution of 1 mol/liter containing 20 weight % of sodium hydroxide. Then, polymer gel grains were obtained. The gel was washed with methanol to remove the surfactant and was dried. Carboxymethyl cellulose was mixed by 5 parts to 95 parts of the polymer gel powder obtained, and a solution of 50% acetone-50% ion-exchanged water was added to the mixture, whereby a paste was prepared. The paste was applied onto an ITO-coated glass substrate and was dried. The resulting paste was caused to absorb a potassium hydroxide aqueous solution of 30 weight % containing 2 weight % of lithium hydroxide. Thus, a layer of polymer gel having a thickness of 50 microns was formed. The polymer gel layer was sandwiched between the above glass substrate and another ITO-coated glass substrate. As in Experiment 1, an impedance measurement was performed, and the ionic conductivity of the polymer gel layer was calculated from the thickness thereof.

Also, a granular polymer gel electrolyte, which was prepared in such a way that the polymer gel powder obtained by the above process was caused to absorb an aqueous solution of potassium hydroxide, was observed with an electron microscope, and a regular columnar structure was seen.

Comparative Experiment 11

Polymer gel grains were obtained in conformity with the operations of Experiment 11, but the surfactant used in Experiment 11 was not added. Carboxymethyl cellulose was mixed by 5 parts to 95 parts of the polymer gel powder obtained, and a solution of 50% acetone-50% ion-exchanged water was added to the mixture, whereby a paste was prepared. The paste was applied onto an ITO-coated glass substrate and was dried, and it was impregnated with a potassium hydroxide aqueous solution of 30 weight % containing 2 weight % of lithium hydroxide, whereby a polymer gel layer having a thickness of 50 microns was formed as in Experiment 11. The polymer gel layer was sandwiched between the above glass substrate and another ITO-coated glass substrate, and the ionic conductivity of the layer was measured as in Experiment 11. Then, the ionic conductivity based on the measurement of the resistance of the layer was about ⅓ of that exhibited in Experiment 11.

Besides, when the configuration of a granular polymer gel electrolyte obtained by the above process was observed with an electron microscope, the regular columnar structure as seen in Experiment 11 was not seen.

Experiment 12

30 parts of ion-exchanged water were mixed to 70 parts of hydroxypropyl cellulose being a polymer exhibitive of liquid crystallinity, thereby preparing a paste. The paste was applied onto an ITO-coated glass substrate, and it was irradiated with an electron beam with the hydroxypropyl cellulose being in the state of a rheotropic liquid crystal, so as to induce a cross-linking reaction. Then, a polymer gel film was prepared. After the polymer gel film was dried, it was impregnated with a potassium hydroxide aqueous solution of 30 weight % containing 2 weight % of lithium hydroxide, whereby a polymer gel layer having a thickness of 50 microns was formed. The polymer gel layer was sandwiched between the above glass substrate and another ITO-coated glass substrate. As in Experiment 1, an impedance measurement was performed, and the ionic conductivity of the polymer gel layer was calculated from the thickness thereof.

Besides, when the configuration of a polymer gel electrolyte obtained by the above process was observed with an electron microscope, a regular columnar structure was seen.

Comparative Experiment 12

Hydroxypropyl cellulose being a polymer exhibitive of liquid crystallinity as was used in Experiment 12 was replaced with polyvinyl alcohol. In the same way as in Experiment 12, a paste was irradiated with an electron beam so as to induce a cross-linking reaction. Then, a polymer gel film was prepared on an ITO-coated glass substrate. After the polymer gel film was dried, it was impregnated with a potassium hydroxide aqueous solution of 30 weight % containing 2 weight % of lithium hydroxide, whereby a polymer gel layer having a thickness of 50 microns was formed. The polymer gel layer was sandwiched between the above glass substrate and another ITO-coated glass substrate. As in Experiment 1, an impedance measurement was performed, and the ionic conductivity of the layer calculated from the thickness thereof. The ionic conductivity based on the measurement of the resistance of the layer was about ½ of that exhibited in Experiment 12.

Besides, when the configuration of a granular polymer gel electrolyte obtained by the above process was observed with an electron microscope, the regular columnar structure as seen in Experiment 12 was not seen.

Estimation of Ionic Conductivity

As explained before, the ionic conductivities of the ion conductive members (polymer gel electrolytes) manufactured by Experiments 1 to 12 (experimental examples) and Comparative Experiments 1 to 12 were obtained by the impedance measurements. Table 1 below lists the proportions of the ionic conductivities in the experimental examples to those in the respectively corresponding comparative experiments.

As indicated in Table 1, the ionic conductivities of all the ion conductive members (polymer gel electrolytes) in the experimental examples were higher than those of the structures in the corresponding comparative experiments. It is consequently understood that a higher ionic conductivity is attained by manufacturing an ionic conductive structure in accordance with the method of the present invention.

such a manner that the center lines of the nickel plates and those of the inside wall surfaces of the glass container coincided so as to prevent the nickel plates from touching one another. Subsequently, there were mixed 70 parts of acrylonitrile, 30 parts of 4-(6-acryloyloxyhexyloxy)-4'-cianobiphenyl as a liquid-crystalline monomer, 6.5 parts of 1,6-hexanediol diacrylate as a cross-linking agent, and 1 part of 2,2'-dimethoxy-2-phenylacetophenone as an initiator, and a mixed solvent of toluene-dimethyl sulfoxide at 50:50 was added to the mixed solution. The resulting mixed solution was inserted into the glass container 901 so as to cover the nickel plates, and an AC electric field of 100 V (at 400 Hz) was applied across the electrodes being one set of opposing nickel plates, whereby the liquid crystal monomer was

| | Compound for Template | Addition of Electrolyte* | Application of Elec. or Mag. field** | Shape of Polymer gel | Ionic cond.: Experiment/ Comp. experiment |
|---|---|---|---|---|---|
| Exp. 1 | Surfactant | Absent | None | Grains | 3.2 |
| Comp. Exp. 1 | None | Absent | None | Grains | 1.0 |
| Exp. 2 | Low-mol. Liq. Crystal | Absent | Elec. field | Film | 5.1 |
| Comp. Exp. 2 | None | Absent | Elec. field | Film | 1.0 |
| Exp. 3 | Low-mol. Liq. Crystal | Present | Mag. field | Film | 4.1 |
| Comp. Exp. 3 | None | Present | Mag. field | Film | 1.0 |
| Exp. 4 | Low-mol. Liq. Crystal | Absent | Elec. field | Film | 5.7 |
| Comp. Exp. 4 | None | Absent | Elec. field | Film | 1.0 |
| Exp. 5 | Surfactant | Absent | None | Film | 3.9 |
| Comp. Exp. 5 | None | Absent | None | Film | 1.0 |
| Exp. 6 | Liq. Crystalline monomer/Cross-link. agent | Absent | Elec. field | Film | 2.7 |
| Comp. Exp. 6 | None | Absent | None | Film | 1.0 |
| Exp. 7 | Liq. Crystalline polymer | Absent | Mag. field | Film | 4.0 |
| Comp. Exp. 7 | None | Absent | Mag. field | Film | 1.0 |
| Exp. 8 | Surfactant | Absent | None | Film | 2.1 |
| Comp. Exp. 8 | None | Absent | None | Film | 1.0 |
| Exp. 9 | Low-mol. Liq. Crystal | Present | Mag. field | Film | 3.9 |
| Comp. Exp. 9 | None | Present | None | Film | 1.0 |
| Exp. 10 | Surfactant | Absent | None | Grains | 3.0 |
| Comp. Exp. 10 | None | Absent | None | Grains | 1.0 |
| Exp. 11 | Surfactant | Absent | None | Grains | 2.7 |
| Comp. Exp. 11 | None | Absent | None | Grains | 1.0 |
| Exp. 12 | Liq. Crystalline polymer | Absent | None | Film | 2.0 |
| Comp. Exp. 12 | None | Absent | None | Film | 1.0 |

*The column of the "addition of an electrolyte" indicates whether or not any electrolyte was added for the preparation of a gel.
**The column of the "application of an electric field or magnetic field" indicates an expedient for actuating an orienting agent.

Verification of Anisotropic Conduction

Experiment 13

In order to verify the anisotropy of the ionic conductivity of the ion conductive member according to the present invention, processes to be explained below were employed for preparing polymer gel electrolytes and for measuring the ionic conductivities thereof.

Figure 9:
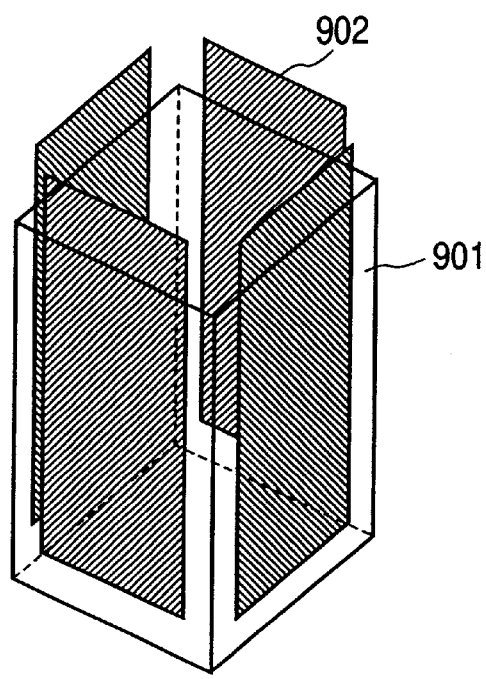
FIG. 9 is a schematic view showing a system for preparing a polymer gel electrolyte which serves to verify the anisotropy of the ionic conduction of an ion conductive member in an embodiment.

A glass-made container 901 as shown in FIG. 9 was in the shape of a square pillar having dimensions of 15 mm×15 mm (internal area)×50 mm (depth). Four nickel plates as electrodes 902, each of which had dimensions of 1 mm (thickness)×10 mm (width)×20 mm (height) and to each of which an insulated lead, not shown, was connected, were respectively arranged on the surfaces of the four inside walls of the container 901 in close adhesion with these surfaces in oriented. No electric field was applied across the other set of opposing nickel plates.

Subsequently, ultraviolet rays were projected from above the surface of the mixed solution filled in the glass container 901, while maintaining the electric field, whereby a polymerizing reaction and a cross-linking reaction were induced. Then, a polymer gel was obtained. After the polymer gel obtained was washed with tetrahydrofuran, the resulting polymer gel was caused to absorb an electrolyte solution of 1 mol/liter in which lithium tetrafluoroborate was dissolved in propylene carbonate. Thus, a polymer gel electrolyte was prepared. The above series of operations were performed in a nitrogen gas atmosphere.

Next, the impedance of the polymer gel electrolyte, which was prepared within the glass-made container 901 shown in FIG. 9 and which was sandwiched between the nickel plates of the opposing electrodes 902, was measured by the same operations as in Experiment 1, and the ionic conductivity of the electrolyte was calculated. As a result, the ionic conductivity in the direction in which the electric field was applied during the preparation of the polymer gel is about 9 times as high as the ionic conductivity in the direction in which the electric field was not applied, and it has been verified that the direction of ionic conduction is anisotropic.

Experiment 14

A polymer gel electrolyte for verifying the anisotropy of the ionic conductivity thereof was prepared in the same way as in Experiment 13, except that different materials to be stated below were employed for the mixed solution of the starting materials of a polymer gel and that polymerizing and cross-linking reactions were induced by the thermodecomposition of an initiator. More specifically, the mixed solution in Experiment 13 was replaced with a mixed solution which was obtained by mixing 50 parts of methyl methacrylate as a monomer, 5 parts of ethyleneglycol dimethacrylate as a cross-linking agent, 40 parts of N-(4-ethoxybenzylidene-4'-butylaniline) being a low-molecular liquid crystal as a template, and 5 parts of 2,2'-azobisisobutyronitrile as the initiator, and by adding 100 parts of propylene carbonate to the preceding materials. As in Experiment 13, the resulting mixed solution was inserted into the glass container 901 so as to cover the electrodes 902 of the nickel plates, and an AC electric field of 100 V (at 400 Hz) was applied across the electrodes of one set of opposing nickel plates, whereby the liquid crystal monomer was oriented. No electric field was applied across the other set of opposing nickel plates.

Subsequently, the mixed solution was heated to 75° C. while maintaining the electric field, whereby a polymerizing reaction and a cross-linking reaction were induced. Then, a polymer gel was obtained. After the polymer gel obtained was washed with tetrahydrofuran, the resulting polymer gel was impregnated with an electrolyte solution of 1 mol/liter in which lithium tetrafluoroborate was dissolved in propylene carbonate, so as to carry the electrolyte solution. Thus, a polymer gel electrolyte was prepared.

Next, the impedance between the nickel plate electrodes across which the electric field was applied during the preparation of the polymer gel, and the impedance between the nickel plate electrodes across which the electric field was not applied, were measured by the same operations as in Experiment 1, and the ionic conductivity of the electrolyte was calculated. As a result, the ionic conductivity in the direction in which the electric field was applied during the preparation of the polymer gel is about 12 times as high as the ionic conductivity in the direction in which the electric field was not applied, and it has been verified that the direction of ionic conduction is anisotropic.

Manufacture of Secondary Battery

A sheet-like secondary battery of "name card" size (55 mm×90 mm×0.5 mm (thickness)) having a configuration shown in FIG. 6 was manufactured as an embodiment by the use of a polymer gel electrolyte prepared by the same process as in any of Experiments 1 to 12. Besides, a sheet-like secondary battery of "name card" size (55 mm×90 mm×0.5 mm (thickness)) having the configuration shown in FIG. 6 was manufactured as a comparative example by the use of a polymer gel electrolyte prepared by the same process as in any of Comparative Experiments 1 to 12, in order to compare the performances of the secondary battery of the present invention and that of the comparative example. In both the embodiment and the comparative example, the secondary batteries were manufactured as ones in each of which the capacity of a positive electrode is larger than that of a negative electrode, so that the capacity of the battery is determined by the negative electrode capacity.

There will now be explained the fabricating steps of the individual constituents of the battery and the assemblage of the battery.

Embodiment 1

A sheet-like battery was manufactured in such a way that a negative electrode and a positive electrode were fabricated and were respectively formed with polymer gel electrolyte layers on their surfaces to be opposed, that the negative electrode and positive electrode were laminated together with the sides of the polymer gel electrolyte layers opposed to each other, and that the resulting structure was sealed with moisture-proof films. These fabricating steps will be detailed below with reference to FIG. 6.

(1) Fabricating Steps of Negative Electrode 604

1) A collector 606 made of a copper foil 18 microns thick was washed with acetone as well as isopropyl alcohol and was dried. Thereafter, with the copper foil set as a cathode and an SUS plate set as an anode being a counter electrode, a current of 28 mA/cm$^2$ was caused to flow in the electrolyte solution for tin-electroplating (an aqueous solution containing 40 g/L of tin sulfate, 60 g/L of sulfuric acid and 2 g/L of gelatin). Thus, a layer (first layer) 605 of tin grains having diameters of 10 microns or below was formed on one surface of the copper foil (collector 606) to a thickness of 30 microns.

2) Subsequently, the copper foil overlaid with the tin layer was cut into a predetermined size, and a lead of nickel wire was connected to the resulting copper foil by spot welding. Then, a negative electrode 604 was obtained.

(2) Fabricating Steps of Positive Electrode 607

1) After lithium carbonate and cobalt carbonate were mixed at a mol ratio of 1:2, the resulting mixture was heat-treated by an air flow at 800° C. Then, a lithium-cobalt oxide was prepared.

2) 3 parts of carbon powder of acetylene black and 5 parts of polyvinylidene-fluoride powder were mixed into 92 parts of the lithium-cobalt oxide prepared at the above step 1. Thereafter, N-methyl pyrrolidone was added to the resulting mixture.

A paste obtained at the above step 2 was applied onto a collector 609 made of an aluminum foil 20 microns thick and was dried. Thereafter, the thickness of the layer of the positive electrode active material 608 (the paste) was adjusted to 90 microns by a roll press machine. Further, a lead of aluminum was connected to the aluminum foil formed with the active material layer, by an ultrasonic welder, and the resulting structure was dried at 150° C. under a reduced pressure. Then, a positive electrode 607 was obtained.

(3) Formation of Polymer Gel Layers on Surfaces of Negative Electrode and Positive Electrode All operations were performed in an argon gas atmosphere.

There were mixed 80 parts of ethyleneglycol monomethylether methacrylate, 20 parts of 4-(6-acryloyloxyhexyloxy)-4'-cyanobiphenyl as a liquid crystalline monomer, 6.5 parts of 1,6-hexanediol diacrylate as a cross-linking agent, and 1 part of 2,2'-dimethoxy-2-phenylacetophenone as an initiator. An electrolyte solution of 1 mol/liter in which lithium tetrafluoroborate was dissolved in propylene carbonate was added by 400 parts to the mixed solution. The resulting mixed solution was applied onto the active material layers of the negative electrode and positive electrode fabricated as explained in the above items (1) and (2), and a magnetic field of 2 tesla was applied in a direction perpendicular to the planes of the electrodes by an electromagnet, whereby the liquid crystal monomer was oriented. Thereafter, the resulting structure was irradiated with ultraviolet rays to induce a polymerizing reaction and a cross-linking reaction. Then, the negative electrode and positive electrode formed with respective layers of a polymer gel electrolyte were obtained.

(4) Assemblage of Secondary Battery

All operations were performed in an argon gas atmosphere.

The polymer gel electrolyte layers of the negative electrode and positive electrode obtained as explained in the above item (3) were further impregnated with an electrolyte solution of 1 mol/liter in which lithium tetrafluoroborate was dissolved in propylene carbonate, so as to carry the electrolyte solution. Thereafter, the negative electrode and positive electrode were laminated together so that their polymer gel electrolyte layers might mate with each other. The lead parts of the electrodes, however, were prevented from overlapping and short circuiting.

The negative and positive electrodes laminated together were sandwiched between two moisture-proof films, each of which was a layer film of polypropylene/aluminum foil/polyethylene terephthalate. Thereafter, the resulting structure was put into a pressure reducing apparatus to which an evacuation device including a vacuum pump was connected, and the interior thereof was brought into a reduced pressure atmosphere so as to draw out gases. Subsequently, the resulting structure was sealed by fusion welding the edge parts of the moisture-proof films. Then, the sheet-like battery shown in FIG. 6 was manufactured.

Comparative Example 1

A sheet-like battery was manufactured in the same way as in Embodiment 1, except that in this comparative example, in the formation of the polymer gel layers on the surfaces of the negative and positive electrodes as explained in the above item (3) of Embodiment 1, methyl acrylate was used instead of 4-(6-acryloyloxyhexyloxy)-4'-cyanobiphenyl being the liquid crystalline monomer. That is, in this example, the liquid crystal monomer serving as the template in Embodiment 1 was not used.

Estimation of Batteries in Embodiment 1 and Comparative Example 1

Regarding each of the secondary batteries of Embodiment 1 and Comparative Example 1 manufactured by the foregoing steps, the same device as in Experiment 1 (a device shown In FIG. 8) was connected to the positive electrode terminal and negative electrode terminal of the battery, and the internal resistance of the battery was measured with a measurement signal of 1 kilohertz.

Besides, a charge and discharge test was carried out under the conditions that one cycle consisted of charge and discharge of 0.2 C (electric current of 0.2 times a capacity/hour) with the capacity of the manufactured secondary battery assumed to be a value calculated from the weight of the negative electrode, and a rest time period of 30 minutes, and that the cut-off voltage of the charge was set at 4.5 V, while the cut-off voltage of the discharge was set at 2.8 V. Incidentally, the charge and discharge test was started with the charge, and three cycles of charge and discharge were repeated. As to the internal resistance and the discharge capacity of the third cycle, the respective values of the battery in Embodiment 1 were estimated with the normalization that the values of the battery in Comparative Example 1 were set at 1.0. The results of the estimation are indicated in Table 2 below. It has been revealed that, with the battery of Embodiment 1, the internal resistance can be made lower than in the battery of Comparative Example 1, while the capacity of discharge can be made larger.

TABLE 2

| | Internal Resistance | Capacity of Discharge |
| --- | --- | --- |
| Embodiment 1/ Comparative Ex. 1 | 0.19 | 1.3 |

Embodiment 2

A sheet-like battery constructed as shown in FIG. 6 was manufactured in such a way that a negative electrode and a positive electrode were fabricated and were respectively formed with polymer gel electrolyte layers on their surfaces to be opposed, that the negative electrode and positive electrode were laminated together with the sides of the polymer gel layers opposed to each other, and that the resulting structure was sealed with moisture-proof films. These fabricating steps will be explained with reference to FIG. 6.

(1) Preparation of Granular Polymer Gel

A reaction vessel was filled with dried nitrogen gas. 15.0 parts of polyoxyethylene hexadecylether being a nonionic surfactant, which was employed as a compound having a molecular structure to serve as a template, and 275 parts of ion-exchanged water, were put into the reaction vessel and were agitated. Subsequently, 8.76 parts of diethyleneglycol monomethylether methacrylate and 0.24 part of ethyleneglycol dimethacrylate were agitated well and were dropped into a three-necked flask using a dropping device, and the resulting system was agitated well until it became uniform. Further, an aqueous solution in which 0.03 part of potassium peroxosulfate was dissolved in 10 parts of ion-exchanged water was dropped as a polymerization initiator into the three-necked flask using the dropping device. Polymerization was performed at 75° C. for 7 hours while the interior of the three-necked flask was agitated. Thereafter, a granular polymer gel obtained was washed with water and ethanol and was dried. Then, a powdery cross-linked polymer was obtained.

(2) Fabrication of Negative Electrode 604

A negative electrode 604 was fabricated by the same steps as in Embodiment 1.

(3) Fabrication of Positive Electrode 607

1) After lithium nitrate and nickel carbonate were mixed at a mol ratio of 1:1, the resulting mixture was heat-treated in an air flow at 750° C. Then, a lithium-nickel oxide was prepared.

2) 3 weight % of carbon powder of acetylene black, 4 weight % of polyvinylidene fluoride powder, and 1 weight % of granular polymer gel obtained by the operations of the above item (1) were mixed into the lithium-nickel oxide prepared at the above step 1. Thereafter, N-methyl pyrrolidone was added to the resulting mixture.

A paste obtained at the above step 2 was applied onto a collector 609 made of an aluminum foil 20 microns thick and was dried. Thereafter, the thickness of the layer of the positive electrode active material 608 (the paste) was adjusted to 90 microns by a roll press machine. Further, a lead of aluminum was connected to the aluminum foil formed with the active material layer, by an ultrasonic welder, and the resulting structure was dried at 150° C. under a reduced pressure. Then, a positive electrode 607 was obtained.

(4) Formation of Polymer Gel Layers on Surfaces of Negative Electrode and Positive Electrode.

All operations were performed in an argon gas atmosphere.

1) 10 parts of polyethylene oxide as a supporting material for the polymer gel in the shape of fine grains obtained by the operations of the above item (1) were mixed into 90 parts of the granular polymer gel, and n-hexane was added to the resulting mixture. Then, a paste was prepared.

2) The paste prepared by the above step 1 was applied onto the negative electrode active material layer fabricated by the operations of the above item (2) and the positive electrode active material layer fabricated by the operations of the above item (3), and it was dried. Then, polymer gel layers were formed on the surfaces of the negative electrode active material layer and the positive electrode active material layer.

(5) Assemblage of Secondary Battery

All operations were performed in an argon gas atmosphere.

The polymer gel electrolyte layers of the negative electrode and positive electrode obtained as explained in the above item (4) were further caused to absorb an electrolyte solution of 1 mol/liter in which lithium tetrafluoroborate was dissolved in propylene carbonate, so as to form polymer gel electrolyte layers. Thereafter, the negative electrode and positive electrode were laminated together so that their polymer gel electrolyte layers might mate with each other. The lead parts of the electrodes, however, were prevented from overlapping and short circuiting.

The negative and positive electrodes laminated together were sandwiched between two moisture-proof films, each of which was a layer film of polypropylene/aluminum foil/polyethylene terephthalate. Thereafter, the resulting structure was put into a pressure reducing apparatus to which an evacuation device including a vacuum pump was connected, and the interior thereof was brought into a reduced pressure atmosphere so as to draw out gases. Subsequently, the resulting structure was sealed by fusion welding the edge parts of the moisture-proof films. Then, the sheet-like battery as shown in FIG. 6 was manufactured.

Comparative Example 2

A sheet-like battery was manufactured in the same way as in Embodiment 2, except that in this comparative example, in the preparation of the granular polymer gel as explained in the above item (1) of Embodiment 2, the surfactant was not used.

Estimation of Batteries in Embodiment 2 and Comparative Example 2

Regarding each of the secondary batteries manufactured by the foregoing steps, the same device as in Experiment 1 (a device shown in FIG. 8) was connected to the positive electrode terminal and negative electrode terminal of the battery, and the internal resistance of the battery was measured with a measurement signal of 1 kilohertz.

Besides, a charge and discharge test was carried out under the conditions that one cycle consisted of charge and discharge of 0.2 C (electric current of 0.2 times a capacity/hour) with the capacity of the manufactured secondary battery assumed to be a value calculated from the weight of the negative electrode, and a rest time period of 30 minutes, and that the cut-off voltage of the charge was set at 4.5 V, while the cut-off voltage of the discharge was set at 2.8 V. Incidentally, the charge and discharge test was started with the charge, and three cycles of charge and discharge were repeated.

As to the internal resistance and the discharge capacity of the third cycle, the respective values of the battery in Embodiment 2 were estimated with the normalization that the values of the battery in Comparative Example 2 were set at 1.0. The results of the estimation are indicated in Table 3 below. It has been revealed that, with the battery of Embodiment 2, the internal resistance can be made lower than in the battery of Comparative Example 2, while the capacity of discharge can be made larger.

TABLE 3

| | Internal Resistance | Capacity of Discharge |
|---|---|---|
| Embodiment 2/ Comparative Ex. 2 | 0.32 | 1.2 |

Embodiment 3

A sheet-like battery constructed as shown in FIG. 6 was manufactured in such a way that a negative electrode and a positive electrode were fabricated and were respectively formed with polymer gel layers on their surfaces to be opposed, that the negative electrode and positive electrode were laminated together with the sides of the polymer gel layers opposed to each other, and that the resulting structure was sealed with moisture-proof films. These fabricating steps will be explained with reference to FIG. 6.

(1) Preparation of Mixed Monomer Solution Containing Monomers for Formation of Polymer Gel Electrolyte A mixed solution was prepared in such a way that 70 parts of acrylonitrile as a monomer, 30 parts of 4-(6-acryloyloxyhexyloxy)-4'-cyanobiphenyl as a liquid crystalline monomer, 6.5 parts of 1,6-hexanediol diacrylate as a cross-linking agent, and 5 parts of benzoyl peroxide as an initiator were mixed into 550 parts of an electrolyte solution of 1 mol/liter in which lithium tetrafluoroborate was dissolved in a solvent consisting of propylene carbonate and ethylene carbonate at a weight ratio of 50:50.

(2) Fabricating Steps of Negative Electrode 604

A paste was prepared by adding N-methyl-2-pyrrolidone to 95 parts of fine powder of natural graphite which were heat-treated at 2000° C. in an argon gas flow and 5 parts of powder of polyvinylidene fluoride. After the prepared paste was applied onto a collector 606 of copper foil 18 microns thick and was dried, the thickness of an active material layer (graphite layer) 605 was adjusted to 90 microns by a roll press machine. Thus, a negative electrode 604 was obtained.

(3) Fabricating Steps of Positive Electrode 607

A positive electrode 607 was obtained by the same steps as in Embodiment 1.

(4) Formation of Polymer Gel Electrolyte Layer

All operations were performed in an argon-gas atmosphere.

Colloidal silica having a grain diameter of 5 microns was dispersed as a spacer on the negative electrode active material layer fabricated in the above item (2). Thereafter, the positive electrode fabricated in the above item (3) was laminated with the positive electrode active material layer opposing to the negative electrode active material layer, and the mixed monomer solution containing monomers prepared in the above item (1) was injected between the negative electrode and positive electrode defining a gap of 5 microns. Subsequently, a magnetic field of 2 tesla was applied by an electromagnet so as to act in a direction perpendicular to the planes of the negative and positive electrodes, and the initiator was decomposed at 85° C. so as to induce the polymerizing and cross-linking reactions of the mixed solution. Thus, a polymer gel electrolyte layer was formed between the negative electrode and the positive electrode.

(5) Assemblage of Secondary Battery

All operations were performed in an argon gas atmosphere.

The negative and positive electrodes between which the polymer gel electrolyte prepared in the above item (4) was interposed were sandwiched between two moisture-proof films, each of which was a layer film of polypropylene/aluminum foil/polyethylene terephthalate. Thereafter, the resulting structure was put into a pressure reducing apparatus to which an evacuation device including a vacuum pump was connected, and the interior thereof was brought into a reduced pressure atmosphere so as to draw out gases. Subsequently, the resulting structure was sealed by fusion welding the edge parts of the moisture-proof films. Then, the sheet-like battery as shown in FIG. 6 was manufactured.

Comparative Example 3-1

A sheet-like battery was manufactured in the same way as in Embodiment 3, except that in this comparative example, in the preparation of the mixed monomer solution containing monomers for the formation of the polymer gel electrolyte as explained in the above item (1) of Embodiment 3,4-(6-acryloyloxyhexyloxy)-4'-cianobiphenyl as a liquid crystalline monomer serving also as an orienting agent was replaced with 2-ethoxyethyl acrylate.

Comparative Example 3-2

A sheet-like battery was manufactured in the same way as in Embodiment 3, except that in this comparative example, the mixed solution containing monomers for the formation of the polymer gel electrolyte as explained in the item (1) of Embodiment 3 and the polymer gel electrolyte layer as explained in the item (4) were not prepared. A separator which was made of a porous polypropylene film 25 microns thick was held between the negative and positive electrodes fabricated in the respective items (2) and (3) of Embodiment 3. The separator was impregnated with an electrolyte solution of 1 mol/liter in which lithium tetrafluoroborate was dissolved in a solvent consisting of propylene carbonate and ethylene carbonate at a weight ratio of 50:50, so as to carry the electrolyte solution. The resulting structure of the negative electrode/separator (electrolyte solution)/positive electrode was sandwiched between two moisture-proof films, each of which was a layer film of polypropylene/aluminum foil/polyethylene terephthalate. Thereafter, the resulting structure was sealed by fusion welding the edge parts of the moisture-proof films. Then, the sheet-like battery was manufactured.

Estimation of Batteries in Embodiment 3 and Comparative Examples 3-1 and 3-2

Regarding each of the secondary batteries manufactured by the foregoing steps, the same device as in Experiment 1 (a device shown in FIG. 8) was connected to the positive electrode terminal and negative electrode terminal of the battery, and the internal resistance of the battery was measured with a measurement signal of 1 kilohertz.

Besides, a charge and discharge test was carried out under the conditions that one cycle consisted of charge and discharge of 0.2 C (electric current of 0.2 times a capacity/hour) with the capacity of the manufactured secondary battery assumed to be a value calculated from the weight of the negative electrode, and a rest time period of 30 minutes, and that the cut-off voltage of the charge was set at 4.5 V, while the cut-off voltage of the discharge was set at 2.8 V. Incidentally, the charge and discharge test was started with the charge, and three cycles of charge and discharge were repeated. Thereafter, in the fourth cycle, the battery was charged for 3 hours by combining a constant current of 1 C and a constant voltage of 6 V. More specifically, the charge was performed with the current value of 1 C. When a battery voltage reached 6 V, the constant current charge was changed over to the constant voltage charge of 6 V. Herein, the battery was discharged with a current of 0.5 C. Further, in the fifth cycle, the battery was charged and discharged with the current of 0.5 C with the cut-off voltage of the charge set at 4.5 V and that of the discharge set at 2.8 V.

As to the internal resistance and the discharge quantities of the third and fifth cycles, the respective values of the battery in Embodiment 3 were estimated with the normalization that the values of the battery in each comparative example were set at 1.0. The results of the estimation are indicated in Table 4 below.

TABLE 4

|  | Internal resistance | Capacity of Discharge of third cycle | Capacity of Discharge of fifth cycle |
| --- | --- | --- | --- |
| Emb. 3/Comparative Ex. 3-1 | 0.20 | 1.3 | 1.4 |
| Emb. 3/Comparative Ex. 3-2 | 1.0 | 1.0 | 5.7 |

The results indicated in Table 4 have revealed that, with the battery of Embodiment 3, the internal resistance can be made lower than in the battery of Comparative Example 3-1, while the capacity of discharge can be made larger. It has been found that the internal resistance and discharge capacity of the battery of Embodiment 3 are equivalent to those of a battery employing the electrolyte solution in Comparative Example 3-2. Further, it has been found that the battery of Embodiment 3 is more immune to overcharge than the battery employing the electrolyte solution in Comparative Example 3-2.

In addition, the batteries of Embodiment 3 and Comparative Example 3-2 were separately manufactured, and their cycle lifetimes were estimated by performing cycle lifetime tests of charge and discharge with a current of 0.5 C under the condition that the cut-off voltages of charge and discharge were respectively set at 4.5 V and 2.5 V. By the way, the "cycle lifetime" was defined as the number of cycles in which the capacity of the battery came to be below 60% of a prescribed battery capacity. The normalized value of the cycle lifetime of the battery of Embodiment 3 was 1.2 with the cycle lifetime of the battery of Comparative Example 3-2 set at 1.0. It has been revealed that the battery of Embodiment 3 is superior to the battery of Comparative Example 3-2 in the charge and discharge cycle lifetime.

Embodiment 4

A sheet-like battery constructed as shown in FIG. 6 was manufactured in such a way that a negative electrode and a positive electrode were fabricated and were respectively formed with polymer gel layers on their surfaces to be opposed, that the negative electrode and positive electrode were laminated together with the sides of the polymer gel layers opposed to each other, and that the resulting structure was sealed with moisture-proof films. These fabricating steps will be explained below with reference to FIG. 6.

(1) Preparation of Polymer Gel Electrolyte

All operations were performed in an argon gas atmosphere.

1) In a mixed solution consisting of 30 parts of potassium palmitate as a surfactant and 70 parts of ion-exchanged water, nitrogen gas was bubbled for gas substitution. Thereafter, 8.76 parts of ethyleneglycol monomethylether methacrylate as well as 0.24 part of ethyleneglycol dimethacrylate, and 0.03 part of potassium peroxosulfate as a polymerization initiator were added and agitated to prepare a mixed solution.

2) A piece of nonwoven fabric membrane of polypropylene having a thickness of 50 microns was immersed in the mixed monomer solution prepared by the above step 1, and it was heated at 75° C. so as to induce a polymerizing reaction and a cross-linking reaction. Thus, a film polymer gel supported by the nonwoven polypropylene membrane was obtained. After the polymer gel obtained was washed with methyl alcohol, its thickness was made uniform by a heating roll press machine. The resulting polymer gel was caused to absorb an electrolyte solution of 1 mol/liter in which lithium tetrafluoroborate was dissolved in propylene carbonate. Then, a polymer gel electrolyte was obtained.

(2) Fabrication of Negative Electrode 604

An expanded metal material 606 of nickel 20 $\mu$m thick was cut into a predetermined size. Thereafter, the cut nickel piece was secured by pressing to a lithium metal foil 605 25 $\mu$m thick, so as to be embedded in lithium metal. The surface of the resulting lithium metal piece was etched by turning argon gas into a plasma. Thus, a negative electrode 604 was fabricated.

(3) Fabrication of Positive Electrode 607

1) Electrolytic manganese dioxide and lithium carbonate were mixed at a mol ratio of 1:0.4. Thereafter, the mixture was heat-treated at 800° C. Thus, a lithium-manganese oxide was prepared.

2) 3 weight % of carbon powder of acetylene black, 4 weight % of powder of polyvinylidene fluoride, and 1 weight % of the powdery polymer gel obtained by the operations of the above item (1) in Embodiment 2, were mixed into the lithium-manganese oxide prepared by the step 1. Thereafter, N-methyl pyrrolidone was added to the mixture. Thus, a paste was prepared.

The paste obtained at the above step 2 was applied onto a collector 609 made of an aluminum foil 20 microns thick and was dried. Thereafter, the thickness of the layer of the positive electrode active material (the paste) 608 was adjusted to 90 microns by a roll press machine. Further, a lead of aluminum was connected to the aluminum foil formed with the active material layer, by an ultrasonic welder, and the resulting structure was dried at 150° C. under a reduced pressure. Then, a positive electrode 607 was obtained.

(4) Assemblage of Secondary Battery

All operations were performed in an argon gas atmosphere.

The positive electrode 607 obtained in the above item (3) was further impregnated with an electrolyte solution of 1 mol/liter in which lithium tetrafluoroborate was dissolved in propylene carbonate, so as to carry the electrolyte solution. Thereafter, the polymer gel electrolyte film 601 obtained in the above item (1) was placed on the resulting positive electrode, and it was overlaid with the negative electrode 604 obtained in the above item (2). The positive electrode, the electrolyte film and the negative electrode were laminated together. The lead parts of the electrodes, however, were prevented from overlapping and short circuiting.

The negative and positive electrodes laminated together were sandwiched between two moisture-proof films, each of which was a layer film of polypropylene/aluminum foil/polyethylene terephthalate. Thereafter, the resulting structure was put into a pressure reducing apparatus to which an evacuation device including a vacuum pump was connected, and the interior thereof was brought into a reduced pressure atmosphere so as to draw out gases. Subsequently, the resulting structure was sealed by fusion welding the edge parts of the moisture-proof films. Then, the sheet-like battery constructed as shown in FIG. 6 was manufactured.

Comparative Example 4-1

A sheet-like battery was manufactured in the same way as in Embodiment 4, except that in this comparative example, no surfactant was used at the step 1 in the preparation of the polymer gel electrolyte as explained in the item (1) of Embodiment 4.

Comparative Example 4-2

A sheet-like battery was manufactured in the same way as in Embodiment 4, except that in this comparative example, the polymer gel electrolyte as explained in the item (1) of Embodiment 4 was not prepared. A separator which was made of a microporous polypropylene membrane 50 microns thick was held between the negative and positive electrodes 604, 607 fabricated in the respective items (2) and (3) of Embodiment 4. Herein, the separator had been impregnated with an electrolyte solution of 1 mol/liter in which lithium tetrafluoroborate was dissolved in a solvent consisting of propylene carbonate and ethylene carbonate at a weight ratio of 50:50, so as to carry the electrolyte solution. The resulting structure of the negative electrode/separator (electrolyte solution)/positive electrode was sandwiched between two moisture-proof films, each of which was a layer film of polypropylene/aluminum foil/polyethylene terephthalate. Thereafter, the resulting structure was sealed by fusion welding the edge parts of the moisture-proof films. Then, the sheet-like battery was manufactured.

Estimation of Batteries in Embodiment 4 and Comparative Examples 4-1 and 4-2

Regarding each of the secondary batteries manufactured by the foregoing steps, the same device as in Experiment 1 (a device shown in FIG. 8) was connected to the positive electrode terminal and negative electrode terminal of the battery, and the internal resistance of the battery was measured with a measurement signal of 1 kilohertz.

Besides, a charge and discharge test was carried out under the conditions that one cycle consisted of charge and discharge of 0.2 C (electric current of 0.2 times a capacity/hour) with the capacity of the manufactured secondary battery assumed to be a value calculated from the weight of the negative electrode, and a rest time period of 30 minutes, and that the cut-off voltage of the charge was set at 4.5 V, while the cut-off voltage of the discharge was set at 2.8 V. Incidentally, the charge and discharge test was started with the charge, and three cycles of charge and discharge were repeated. Thereafter, in the fourth cycle, the battery was charged for 3 hours by combining a constant current of 1 C and a constant voltage of 6 V. More specifically, the charge was performed with the current value of 1 C. When a battery voltage reached 6 V, the constant current charge was changed over to the constant voltage charge of 6 V. Herein, the battery was discharged with a current of 0.5 C. Further, in the fifth cycle, the battery was charged and discharged with the current of 0.5 C with the cut-off voltage of the charge set at 4.5 V and that of the discharge set at 2.8 V. As to the internal resistance and the discharge capacities of the third and fifth cycles, the respective values of the battery in Embodiment 4 were estimated with the normalization that the values of the battery in each comparative example were set at 1.0. The results of the estimation are indicated in Table 5 below.

TABLE 5

| | Internal resistance | Capacity of Discharge of third cycle | Capacity of Discharge of fifth cycle |
|---|---|---|---|
| Emb. 4/Comparative Ex. 4-1 | 0.16 | 1.2 | 1.3 |
| Emb. 4/Comparative Ex. 4-2 | 1.1 | 0.95 | 3.7 |

It has been revealed that, with the battery of Embodiment 4, the internal resistance can be made lower than in the battery of Comparative Example 4-1, while the capacity of discharge can be made larger. It has been found that, even when compared with a battery employing the electrolyte solution of Comparative Example 4-2, the battery of Embodiment 4 is not inferior in the internal resistance and the capacity of discharge. Further, it has been found that the battery of Embodiment 4 is more immune to overcharge than the battery employing the electrolyte solution in Comparative Example 4-2.

In addition, the batteries of Embodiment 4 and Comparative Example 4-2 were separately manufactured, and their cycle lifetimes were estimated by performing cycle lifetime tests of charge and discharge with a current of 0.5 C under the condition that the cut-off voltages of charge and discharge were respectively set at 4.5 V and 2.5 V. By the way, the "cycle lifetime" was defined as the number of cycles in which the capacity of the battery came to be below 60% of a prescribed battery capacity. The normalized value of the cycle lifetime of the battery of Embodiment 4 was 97 with the cycle lifetime of the battery of Comparative Example 4-2 set at 1.0. With the battery of Comparative Example 4-2, the dendrite of lithium was produced by the repetition of charge and discharge, and the cycle lifetime was short. In contrast, with the battery of Embodiment 4, the production of the dendrite of lithium was suppressed, and the cycle lifetime was lengthened.

Embodiment 5

A sheet-like battery constructed as shown in FIG. 6 was manufactured in such a way that a negative electrode and a positive electrode were laminated and were respectively formed with polymer gel layers on their surfaces to be opposed, that the negative electrode and positive electrode were stuck together with the sides of the polymer gel layers opposed to each other, and that the resulting structure was sealed with moisture-proof films.

(1) Formation of Polymer Gel Electrolyte Layers

1) As in Experiment 1, 15.0 parts of polyoxyethylene hexadecylether being a nonionic surfactant, which was employed as a compound having a molecular structure to serve as a template and 275 parts of ion-exchanged water were put into a reaction vessel and were agitated. Besides, argon gas was bubbled for gas substitution. Subsequently, 8.76 parts of diethyleneglycol monomethylether methacrylate, 0.24 part of ethyleneglycol dimethacrylate, and 0.03 part of potassium peroxosulfate as a polymerization initiator were added, and polymerization was performed at 75° C. for 7 hours while the resulting mixture was agitated. Thereafter, a granular polymer gel obtained was washed with water and ethanol and was dried. Then, a powdery cross-linked polymer was obtained.

2) The powdery cross-linked polymer obtained by the above operations in step 1 was calendered. Then, a cross-linked polymer film was obtained.

(2) Fabrication of Negative Electrode 604

The cross-linked polymer powder obtained as explained in the above item (1) was further pulverized. 1 part of the finer cross-linked polymer powder was added to 95 parts of fine powder of natural graphite which were heat-treated at 2000° C. in an argon gas flow and 4 parts of powder of polyvinylidene fluoride. N-methyl-2-pyrrolidone was added to the resulting mixture so as to prepare a paste. After the prepared paste was applied onto a collector 606 of copper foil 18 microns thick and was dried, the thickness of an active material layer (graphite layer) 605 was adjusted to 90 microns by a roll press machine. Thus, a negative electrode 604 was obtained.

(3) Fabricating Steps of Positive Electrode 607

1) After lithium carbonate and cobalt carbonate were mixed at a mol ratio of 1:2, the resulting mixture was heat-treated by an air flow at 800° C. Then, a lithium-cobalt oxide was prepared.

2) 3 parts of carbon powder of acetylene black, 4 parts of powder of polyvinylidene fluoride, and 1 part of finer powder obtained by further pulverizing the cross-linked polymer powder prepared in the above item (1), were added to and mixed with 92 parts of the lithium-cobalt oxide prepared at the above step 1. Thereafter, N-methylpyrrolidone was added to the resulting mixture so as to prepare a paste.

After the paste obtained at the above step 2 was applied onto a collector 609 of aluminum foil 20 microns thick and was dried, the thickness of a positive electrode active material layer (paste layer) 608 was adjusted to 90 microns by a roll press machine. Further, a lead of aluminum was connected to the aluminum foil formed with the active material layer, by an ultrasonic welder, and the resulting structure was dried at 150° C. under a reduced pressure. Thus, a positive electrode 607 was obtained.

(4) Preparation of Electrolyte Solution

An electrolyte solution of 1 mol/liter was prepared by dissolving lithium tetrafluoroborate in propylene carbonate.

(5) Assemblage of Secondary Battery

All operations were performed in an argon gas atmosphere.

The electrolyte solution prepared in the above item (4) was dropped onto the active material layer 605 of the negative electrode 604 obtained in the above item (2), the positive electrode 607 obtained in the above item (3) and the cross-linked polymer film 601 obtained in the above item (1), whereby both the active material layers were caused to absorb the electrolyte solution. Subsequently, the cross-linked polymer film 601 containing absorbed liquid was stacked on the active material layer 605 of the negative electrode 604, and it was overlaid with the positive electrode 607. Thus, a cell was formed.

Further, the cell thus formed as a stacked body was sandwiched between two moisture-proof films, each of which was a layer film of polypropylene/aluminum foil/polyethylene terephthalate. Thereafter, the resulting structure was put into a pressure reducing apparatus to which an evacuation device including a vacuum pump was connected, and the interior thereof was brought into a reduced pressure atmosphere so as to draw out gases. Subsequently, the resulting structure was sealed by fusion welding the edge parts of the moisture-proof films. Then, the sheet-like battery constructed as shown in FIG. 6 was manufactured.

Comparative Example 5

A sheet-like battery was manufactured in the same way as in Embodiment 5, except that in this comparative example, no surfactant was used at the step 1 in the preparation of the polymer gel electrolyte in the item (1) of Embodiment 5. That is, in this example, the compound employed for a template in Embodiment 5 was not used.

Estimation of Batteries in Embodiment 5 and Comparative Example 5

Regarding each of the secondary batteries manufactured by the foregoing steps, the same device as in Experiment 1 (a device shown in FIG. 8) was connected to the positive electrode terminal and negative electrode terminal of the battery, and the internal resistance of the battery was measured with a measurement signal of 1 kilohertz.

Besides, a charge and discharge test was carried out under the conditions that one cycle consisted of charge and discharge of 0.2 C (electric current of 0.2 times a capacity/hour) with the capacity of the manufactured secondary battery assumed to be a value calculated from the weight of the negative electrode, and a rest time period of 30 minutes, and that the cut-off voltage of the charge was set at 4.5 V, while the cut-off voltage of the discharge was set at 2.8 V. Incidentally, the charge and discharge test was started with the charge, and three cycles of charge and discharge were repeated. As to the internal resistance and the discharge capacity of the third cycle, the respective values of the battery in Embodiment 5 were estimated with the normalization that the values of the battery in Comparative Example 5 were set at 1.0. The results of the estimation are indicated in Table 6 below. It has been revealed that, with the battery of Embodiment 5, the internal resistance can be made lower than in the battery of Comparative Example 5, while the capacity of discharge can be made larger.

TABLE 6

| | Internal Resistance | Capacity of Discharge |
|---|---|---|
| Emb. 5/Comparative Ex. 5 | 0.23 | 1.2 |

In the lithium secondary batteries of Embodiment 1 thru Embodiment 5, one sort of supporting electrolyte and three sorts of positive electrode active materials were used. It is to be understood, however, that they are not restrictive, but that various sorts of supporting electrolyte and various sorts of positive electrode active materials explained before can be used. Besides, although the batteries manufactured in the embodiments were in the shape of a sheet, batteries in various shapes such as a coin-shaped battery, a cylindrical battery or a square battery can be manufactured without being restricted to the exemplified shape. When the ion conductive member of the present invention is especially employed, a battery in any desired shape can be manufactured.

Embodiment 6

A sheet-like nickel-hydrogen secondary battery constructed as shown in FIG. 6 was manufactured by steps explained below.

(1) Fabrication of Negative Electrode 604

$Mg_2Ni$ alloy powder and nickel powder which had been obtained by radio frequency melting were mixed at a mol ratio of 1:1. Thereafter, the mixture was kneaded by a planetary gear ball mill. Then, amorphous magnesium-nickel alloy powder was prepared. Subsequently, copper powder as an electric conduction assistant was mixed into the amorphous magnesium-nickel alloy powder, at a weight ratio of 3. The resulting mixed powder was secured to a punched metal piece of nickel by a roller press, and the nickel piece bearing the mixed powder was cut into a predetermined size. A lead of nickel tab was connected to the resulting nickel piece by spot welding. Then, a negative electrode was obtained.

(2) Fabrication of Positive Electrode 607

92 weight % of nickel hydroxide powder and 2 weight % of cobalt oxide powder were mixed, and the mixture was turned into a paste by employing an aqueous solution of carboxymethyl cellulose at 2 weight % to obtain carboxymethyl cellulose at 6 weight % as a binder. A foamed nickel substrate 609 having a thickness of 1.5 mm, a pore diameter of 200 microns and a porosity of 95% was coated and packed with the paste, and it was dried at 120° C. for 1 hour. The resulting substrate was pressed to adjust its thickness. Subsequently, the substrate was cut into a predetermined size, and a lead of nickel tab was connected to the substrate by spot welding. Then, a positive electrode 607 was fabricated.

(3) Formation of Polymer Gel Electrolyte Layer

A polymer solution was prepared in such a way that 40 parts of ion-exchanged water were mixed into 60 parts of hydroxypropyl cellulose being a polymer exhibitive of liquid crystallinity.

A piece of nonwoven polypropylene fabric being 130 microns thick, which had been endowed with a hydrophilicity, was placed on the negative electrode fabricated in the above item (1). The resulting fabric piece was coated with the polymer solution prepared in the above step, and it was let to stand still. Thereafter, the polymer coating was irradiated with an electron beam so as to induce a cross-linking reaction. Then, a polymer gel layer supported by the nonwoven polypropylene fabric was prepared. After drying, the polymer gel layer was impregnated with an aqueous solution of 30 weight % of potassium hydroxide containing 2 weight % of lithium hydroxide. Thus, a polymer gel electrolyte layer was formed. Likewise, the positive electrode fabricated in the above item (2) was immersed in the polymer solution prepared in the above step, and the polymer solution on the positive electrode was irradiated with an electron beam so as to induce a cross-linking reaction, whereby a polymer gel layer was formed on the positive electrode. After the positive electrode formed with the polymer gel layer was dried, it was impregnated with the aqueous solution of 30 weight % of potassium hydroxide containing 2 weight % of lithium hydroxide. Thus, the positive electrode formed with a polymer gel electrolyte layer was fabricated.

(4) Assemblage of Secondary Battery

The positive electrode obtained in the above item (2) was brought into close contact with the polymer gel electrolyte layer supported by the nonwoven polypropylene fabric, the layer having been formed on the negative electrode as explained in the above item (3). On this occasion, the lead parts of the negative and positive electrodes were prevented from short circuiting. The resulting negative and positive electrodes stuck together were sandwiched between two gas barrier films, each of which was a layer film of polypropylene/aluminum foil/polyethylene terephthalate. Thereafter, the resulting structure was put into a pressure reducing apparatus to which an evacuation device including a vacuum pump was connected, and the interior thereof was brought into a reduced pressure atmosphere so as to draw out gases. Subsequently, the resulting structure was sealed by fusion welding the edge parts of the gas barrier or moisture-proof films. Then, the sheet-like battery was manufactured.

Comparative Example 6

A sheet-like battery was manufactured in the same way as in Embodiment 6, that in this comparative example, the polymer gel electrolyte in the item (3) of Embodiment 6 was not formed. More specifically, a separator made of non-woven polypropylene fabric 200 microns thick and endowed with a hydrophilicity, which had been impregnated with an aqueous solution of 30 weight % of potassium hydroxide containing 2 weight % of lithium hydroxide, so as to carry the electrolyte solution, was sandwiched between the negative electrode and positive electrode which had been respectively fabricated in the items (1) and (2) of Embodiment 6. Further, the laminated body of the negative electrode/separator (electrolyte solution)/positive electrode was sandwiched between two moisture-proof films, each of which was a layer film of polypropylene/aluminum foil/polyethylene terephthalate. Thereafter, the resulting structure was sealed by fusion welding the edge parts of the moisture-proof films. Then, the sheet-like battery was manufactured. In this manner, the polymer gel electrolyte in Embodiment 6 was not used in the comparative example.

Estimation of Batteries in Embodiment 6 and Comparative Example 6

Regarding each of the secondary batteries manufactured by the foregoing steps, the same device as in Experiment 1 (a device shown in FIG. 8) was connected to the positive electrode terminal and negative electrode terminal of the battery, and the internal resistance of the battery was measured with a measurement signal of 1 kilohertz.

Besides, a charge and discharge test was carried out under the conditions that one cycle consisted of charge and discharge of 0.2 C (electric current of 0.2 times a capacity/hour) with the capacity of the manufactured secondary battery assumed to be a value calculated from the weight of the negative electrode, and a rest time period of 30 minutes, and that the cut-off voltage of the charge was set at 1.5 V, while the cut-off voltage of the discharge was set at 0.9 V. Incidentally, the charge and discharge test was started with the charge, and ten cycles of charge and discharge were repeated. As to the internal resistance and the discharge quantities of the third and tenth cycles, the respective values of the battery in Embodiment 6 were estimated with the normalization that the values of the battery in Comparative Example 6 were set at 1.0. The results of the estimation are indicated in Table 7 below.

The discharge capacity of the battery of Comparative Example 6 decreased suddenly with the number of charge and discharge cycles. In contrast, the battery of Embodiment 6 did not exhibit sudden decreasing in the discharge capacity.

TABLE 7

|  | Internal resistance | Quantity of Discharge of third cycle | Quantity of Discharge of tenth cycle |
|---|---|---|---|
| Emb. 6/Comparative Ex. 6 | 1.2 | 1.2 | 1.4 |

Embodiment 7

In this embodiment, a coin-shaped nickel-zinc secondary battery having a sectional structure shown in FIG. 7 was manufactured by a process explained below.

(1) Fabrication of Negative Electrode 701

An aqueous solution of dispersed tetrafluoroethylene polymer was added to a mixture consisting of 95 parts of zinc oxide powder and 5 parts of zinc powder, so that the weight ratio between the mixture and the tetrafluoroethylene polymer serving as a binder might become 95:5. The resulting mixture was kneaded into a paste. A punched metal plate of copper was coated with the paste. After drying, the resulting copper plate was pressed by a roll press machine, whereby a zinc negative electrode plate was obtained. The zinc negative electrode plate obtained was punched into a predetermined size. Thus, a negative electrode (701) was fabricated.

(2) Fabrication of Positive Electrode 703

92% of nickel hydroxide powder and 2% of cobalt oxide powder were mixed, and the mixture was turned into a paste by employing an aqueous solution of carboxymethyl cellulose at 2 weight % to obtain carboxymethyl cellulose at 6 weight % as a binder. A foamed nickel substrate having a thickness of 1.5 mm, a pore diameter of 200 microns and a porosity of 95% was coated and packed with the paste, and it was dried at 120° C. for 1 hour. The resulting substrate was pressed to adjust its thickness. Subsequently, an active material borne on the back surface of the substrate was exfoliated by ultrasonic waves so as to denude the nickel of a collector, and the substrate was punched into a predetermined size. Then, a positive electrode (703) was fabricated.

(3) Formation of Polymer Gel Electrolyte Layer 702 being Ion Conductive Member

1) A polymer solution was prepared in such a way that 40 parts of ion-exchanged water were mixed into 60 parts of hydroxypropyl cellulose being a polymer exhibitive of liquid crystallinity.

2) A piece of nonwoven polypropylene fabric 130 microns thick, which had been endowed with a hydrophilicity, was placed on the negative electrode fabricated in the above item (1). The resulting fabric piece was coated with the polymer solution prepared in the above step 1, and it was let to stand still. Thereafter, the polymer coating was irradiated with an electron beam so as to induce a cross-linking reaction. Then, a polymer gel layer supported by the nonwoven polypropylene fabric was prepared. After drying, the polymer gel layer was impregnated with an aqueous solution of 30 weight % of potassium hydroxide containing 2 weight % of lithium hydroxide. Thus, a polymer gel electrolyte layer 702 was formed. Likewise, the positive electrode fabricated in the above item (2) was immersed in the polymer solution prepared in the above step 1, and the polymer solution on the positive electrode was irradiated with an electron beam so as to induce a cross-linking reaction, whereby a polymer gel layer was formed on the surface of the positive electrode opposite to the denuded nickel surface. After the positive electrode formed with the polymer gel layer was dried, it was impregnated with the aqueous solution of 30 weight % of potassium hydroxide containing 2 weight % of lithium hydroxide. Thus, the positive electrode formed with a polymer gel electrolyte layer 702 was fabricated.

(4) Assemblage of Secondary Battery

The positive electrode obtained in the above item (2) was brought into close contact with the polymer gel electrolyte layer supported by the nonwoven polypropylene fabric, the layer having been formed on the negative electrode as explained in the above item (3). The laminated body of the negative electrode 701/polymer gel electrolyte layer 702/positive electrode 703 was inserted into a coin-shaped battery can 705 made of a titanlum-clad stainless steel material, so that the denuded nickel surface of the collector of the positive electrode might come into contact with the bottom of the battery can 705. Thereafter, a gasket 706 made of polypropylene was fitted on the resulting stacked body, and a negative electrode cap 704 was put on the resulting structure and was caulked. Thus, the coin-shaped battery was manufactured.

Comparative Example 7

A coin-shaped battery was manufactured in the same way as in Embodiment 7, except that in this comparative example, the polymer gel electrolyte in the item (3) of Embodiment 7 was not formed. More specifically, a separator made of nonwoven polypropylene fabric 200 microns thick, which had been impregnated with an aqueous solution of 30 weight % of potassium hydroxide containing 2 weight % of lithium hydroxide, so as to carry the electrolyte solution, was sandwiched between the negative electrode 701 and positive electrode 703 instead of the polymer gel electrolyte layer. Further, the laminated body of the negative electrode/separator (electrolyte solution)/positive electrode was inserted into a coin-shaped battery can 705 made of a titanium-clad stainless steel material, so that the denuded nickel surface of the collector of the positive electrode might come into contact with the bottom of the battery can 705. Thereafter, a gasket 706 made of polypropylene was fitted on the resulting laminated body, and a negative electrode cap 704 was put on the resulting structure and was caulked. Then, the coin-shaped battery was manufactured. In this manner, the polymer gel electrolyte in Embodiment 7 was not used in the comparative example.

Estimation of Batteries in Embodiment 7 and Comparative Example 7

Regarding each of the secondary batteries manufactured by the foregoing steps, the same device as in Experiment 1 (a device shown in FIG. 8) was connected to the positive electrode terminal and negative electrode terminal of the battery, and the internal resistance of the battery was measured with a measurement signal of 1 kilohertz.

Besides, the cycle lifetimes of the batteries were estimated by performing cycle lifetime tests of charge and discharge under the conditions that one cycle consisted of charge and discharge of 0.2 C (electric current of 0.2 times a capacity/hour) with the capacity of the manufactured secondary battery assumed to be a value calculated from the weight of the negative electrode, and a rest time period of 30 minutes, and that the cut-off voltages of charge and discharge were respectively set at 2.0 V and 0.9 V. By the way, the "cycle lifetime" was defined as the number of cycles in which the capacity of the battery came to be below 60% of a prescribed battery capacity. The internal resistance and the cycle lifetime of the battery of Embodiment 7 were normalized with those of the battery of Comparative Example 7 set at 1.0. The results are indicated in Table 8 below.

With the nickel-zinc battery of Embodiment 7, the production of the dendrite of zinc attributed to the repetition of charge and discharge was suppressed with respect to the battery of Comparative Example 7, and the cycle lifetime was lengthened.

TABLE 8

|  | Internal resistance | Cycle lifetime |
|---|---|---|
| Emb. 7/Comparative Ex. 7 | 1.1 | 4.6 |

Embodiment 8

In this embodiment, a coin-shaped air-zinc secondary battery having a sectional structure shown in FIG. 7 was manufactured by a process explained below.

(1) Preparation of Polymer Gel

As in Experiment 10, there were mixed 8 parts of acrylamide, 2 parts of acrylic acid, 1 part of methylene bisacrylamide, 20 parts of sodium dodecylsulfonate being an anionic surfactant, 0.4 part of 2,2'-azobisisobutyronitrile being an initiator, and 92 parts of ion-exchanged water. The resulting mixed solution was subjected to radical polymerization at 70° C. in a nitrogen atmosphere while being agitated. Then, a granular polymer gel was obtained. The gel was washed with methanol to remove the surfactant and was dried.

(2) Fabrication of Negative Electrode 701

A tetrafluoroethylene polymer serving as a binder and the polymer gel powder obtained in the above item (1) were further mixed into a mixture consisting of 95 parts of zinc oxide powder and 5 parts of zinc powder, so that the weight ratio among the mixture, the tetrafluoroethylene polymer and the polymer gel powder might become 94:5:1. The resulting mixture was secured onto a punched metal plate of copper and heated by a roll press machine, whereby a zinc negative-electrode plate was obtained. The zinc negative-electrode plate obtained was punched into a predetermined size. Thus, a negative electrode (701) was fabricated.

(3) Fabrication of Positive Electrode 703

A tetrafluoroethylene polymer serving as a binder and the polymer gel powder obtained in the above item (1) were mixed into a mixture in which manganese dioxie, nickel oxide and cobalt oxide were mixed into acetylene black, so that the weight ratio among the mixture, the tetrafluoroethylene polymer and the polymer gel powder might become 94:5:1. The resulting mixture was applied onto a nickel meshwork, and it was secured and heated by a roll press machine. The resulting meshwork was punched into a predetermined size. Thus, a positive electrode (703) was fabricated.

(4) Formation of Polymer Gel Electrolyte Layer 702 being Ion Conductive Member The polymer gel powder obtained in the above item (1) and colloidal silica having a grain diameter of 10 microns were mixed at a weight ratio of 97:3. The resulting mixture was dispersed on the surface of the negative electrode obtained in the above item (2), and an aqueous solution of 30 weight % of potassium hydroxide containing 2 weight % of lithium hydroxide was added to the dispersed mixture. Thus, a polymer gel electrolyte layer 702 was formed.

The positive electrode fabricated in the above item (3) was impregnated with the aqueous solution of 30 weight % of potassium hydroxide containing 2 weight % of lithium hydroxide.

(5) Assemblage of Secondary Battery

A piece of air diffusing paper and a tetrafluoroethylene polymer film being a water repelling film were inserted into a battery can (positive electrode can) 705 with air intake pores, the battery can 705 being made of a titanium-clad stainless steel material. Further, the positive electrode 703 obtained in the above item (3), and the negative electrode 701 covered with the polymer gel electrolyte layer 702 obtained in the above item (4) were brought into close contact and were inserted into the battery can 705. The nickel of the collector of the positive electrode was held in contact with the battery can 705 so as to be electrically conductive thereto. Thereafter, a gasket 706 made of polypropylene was fitted into the resulting can, and a negative electrode cap 704 was put on the resulting structure and was caulked. Thus, the coin-shaped battery was manufactured.

Comparative Example 8

A coin-shaped battery was manufactured in the same way as in Embodiment 8, except that in this comparative example, the polymer gel electrolyte in the item (4) of Embodiment 8 was not formed. Further, a negative electrode and a positive electrode were fabricated using tetrafluoroethylene polymer powder instead of the polymer gel powder which was used for the negative and positive electrodes as explained in the respective items (2) and (3) of Embodiment 8. In assembling a battery, a separator made of nonwoven polypropylene fabric 200 microns thick, which had been impregnated with an aqueous solution of 30 weight % of potassium hydroxide containing 2 weight % of lithium hydroxide, so as to carry the electrolyte solution, was sandwiched between the positive electrode and the negative electrode.

Estimation of Batteries in Embodiment 8 and Comparative Example 8

Regarding each of the secondary batteries manufactured by the foregoing steps, the same device as in Experiment 1 (a device shown in FIG. 8) was connected to the positive electrode terminal and negative electrode terminal of the battery, and the internal resistance of the battery was measured with a measurement signal of 1 kilohertz.

Besides, the cycle lifetimes of the batteries were estimated by performing cycle lifetime tests of charge and discharge under the conditions that one cycle consisted of charge and discharge of 0.2 C (electric current of 0.2 times a capacity/hour) with the capacity of the manufactured secondary battery assumed to be a value calculated from the weight of the negative electrode, and a rest time period of 30 minutes, and that the cut-off voltages of charge and discharge were respectively set at 2.0 V and 0.9 V. By the way, the "cycle lifetime" was determined as the number of cycles in which the capacity of the battery came to be below 60% of a prescribed battery capacity. Further, the batteries of Embodiment 8 and Comparative Example 8 were separately manufactured, and they were preserved in the air for one month with the air intake pores left open. Charge and discharge tests were performed under the condition that the cut-off voltages of charge and discharge were respectively set at 2.0 V and 0.9 V, and the quantities of discharge of the third cycle were measured. The internal resistance, the cycle lifetime and the discharge capacity in the preservation, of the battery of Embodiment 8 were normalized with those of the battery of Comparative Example 8 set at 1.0. The results are indicated in Table 9 below.

As seen from the results shown in Table 9, with the air-zinc battery of Embodiment 8, the production of the dendrite of zinc attributed to the repetition of charge and discharge was suppressed with respect to the battery of Comparative Example 8, and the cycle lifetime was lengthened. Moreover, the characteristics of preservation were superior.

TABLE 9

| | Internal resistance | Cycle Lifetime | Discharge Capacity in preservation |
|---|---|---|---|
| Emb. 8/Comparative Ex. 8 | 1.2 | 6.7 | 1.3 |

It is understood from the estimations of the performances of Embodiments 1 to 8 and Comparative Examples 1 to 8 that secondary batteries which, of course, prevent the leakage of an electrolyte solution and which are excellent in discharge characteristics and good in cycle lifetimes can be manufactured by adopting the structure of the secondary battery of the present invention. Besides, it is understood from the estimations of the batteries of Embodiments 3 and 4 as to overcharge that the secondary battery of the present invention is immune to overcharge, that it can make an overcharge prevention circuit simpler and that it is safe.

As described above, the present invention can provide a secondary battery of high performance employing an ion conductive member whose ionic conductivity is higher and whose discharge characteristics are superior. Further, the application of the present invention to a secondary battery employing lithium or zinc to its negative electrode makes it possible to manufacture a secondary battery in which the growth of the dendrite of lithium or zinc causing the degradation of the performance of the battery can be suppressed, and which has a longer lifetime and a higher energy density.

What is claimed is:

1. A secondary battery wherein an ion conductive member is arranged between a positive electrode and a negative electrode which are disposed in opposition to each other, characterized in that said ion conductive member has its ion channels oriented so as to have a higher ionic conductivity in a direction of joining a plane of said positive electrode and that of said negative electrode, wherein said ion conductive member has a layered structure or a columnar structure.

2. The secondary battery as defined in claim 1, wherein said ion conductive member is made from at least a polymer material and a supporting electrolyte.

3. The secondary battery as defined in claim 2, wherein said ion conductive member further includes a solvent which dissolves said supporting electrolyte.

4. The secondary battery as defined in claim 2, wherein said polymer material is a cross-linked polymer material.

5. The secondary battery as defined in claim 3, wherein said polymer material is in a swollen gel state by absorption of an electrolyte solution which consists essentially of said supporting electrolyte and said solvent.

6. The secondary battery as defined in claim 2, wherein said polymer material is in the shape of a film or a sheet.

7. The secondary battery as defined in claim 2, wherein said polymer material is granular.

8. The secondary battery as defined in claim 2, wherein polymer chains of said polymer material are substantially oriented in at least one direction.

9. The secondary battery as defined in claim 2, wherein said polymer material has at least one sort of bond selected from the group consisting of a carbon-oxygen bond, a carbon-nitrogen bond and a carbon-sulfur bond.

10. The secondary battery as defined in claim 9, wherein said polymer material has at least one sort of functional group selected from the group consisting of an ether group, an ester group, a carbonyl group, an amide group and a nitrile group.

11. The secondary battery as defined in claim 2, wherein said polymer material is a polymer material having a molecular structure which exhibits liquid-crystallinity or a polymer of a diacetylene compound.

12. The secondary battery as defined in claim 11, wherein the liquid-crystalline molecular structure exists at a main chain of said polymer material.

13. The secondary battery as defined in claim 11, wherein the liquid-crystalline molecular structure exists at a side chain of said polymer material.

14. The secondary battery as defined in claim 4, wherein a liquid-crystalline molecular structure exists in a bridging part of said cross-linked polymer material.

15. The secondary battery as defined in claim 11, wherein the liquid-crystalline molecular structure is a molecular structure which is geometrically asymmetric and which is cylindrical or flat or a molecular structure which contains a group in a molecule, the group exhibiting a great dipole moment or polarization effect and having an intermolecular interaction.

16. The secondary battery as defined in claim 3, wherein said solvent is an organic solvent.

17. The secondary battery as defined in claim 3, wherein said ion conductive member is a hybrid structure which consists essentially of said polymer material and a porous oxide.

18. The secondary battery as defined in claim 1, wherein lithium ions can be conducted in said ion conductive member.

19. The secondary battery as defined in claim 2, wherein said supporting electrolyte is a lithium salt.

20. The secondary battery as defined in claim 1, which utilizes a reducing reaction for lithium ions and an oxidizing reaction for lithium.

21. The secondary battery as defined in claim 1, wherein said negative electrode is made from at least a material which accepts lithium ions in a charging reaction and which emits lithium ions in a discharging reaction, and wherein said positive electrode is made from a material which emits lithium ions in the charging reaction and which accepts lithium ions in the discharging reaction.

22. The secondary battery as defined in claim 1, wherein said negative electrode is made from at least one sort of material selected from the group consisting of metal lithium, a metal which is alloyed with lithium deposited in a charging reaction, and a compound which intercalates lithium in the charging reaction, and wherein said positive electrode is made from at least a material which functions to deintercalate lithium ions in said charging reaction and to intercalate lithium ions in a discharging reaction.

23. The secondary battery as defined in claim 22, wherein said negative electrode is made from at least one sort of material selected from the group consisting of metal lithium, a carbonaceous material containing graphite, lithium metal, a metal which is electrochemically alloyed with lithium, a tin oxide, a transition metal oxide, a transition metal nitride, a lithium tin oxide, a lithium transition-metal oxide, a lithium transition-metal nitride, a transition metal sulfide, a lithium transition-metal sulfide, a transition metal carbide, and a lithium transition-metal carbide.

24. The secondary battery as defined in claim 22, wherein said positive electrode is made from at least one sort of material selected from the group consisting of a transition metal oxide, a transition metal nitride, a lithium tin oxide, a lithium transition-metal oxide, a lithium transition-metal nitride, a transition metal sulfide, a lithium transition-metal sulfide, a transition metal carbide, and a lithium transition-metal carbide.

25. The secondary battery as defined in claim 3, wherein said solvent is water.

26. The secondary battery as defined in claim 1, wherein hydrogen ions can be conducted through said ion conductive member.

27. The secondary battery as defined in claim 1, wherein hydroxide ions can be conducted through said ion conductive member.

28. The secondary battery as defined in claim 2, wherein said supporting electrolyte is an alkaline hydroxide.

29. The secondary battery as defined in claim 2, wherein said supporting electrolyte is sulfuric acid.

30. The secondary battery as defined in claim 1, wherein said negative electrode is made from at least a hydrogen-absorbing alloy which absorbs hydrogen during charge and which emits hydrogen ions during discharge.

31. The secondary battery as defined in claim 1, wherein said negative electrode is made from at least zinc.

32. The secondary battery as defined in any of claims 1, 30 and 31, wherein said positive electrode is made from at least nickel hydroxide.

33. The secondary battery as defined in either of claims 1 and 31, wherein said positive electrode is made from at least a catalyst which activates absorbed oxygen.

34. The secondary battery as defined in claim 29, wherein said negative electrode is made from at least lead, while said positive electrode is made from at least a lead oxide.

35. A process for producing a secondary battery wherein an ion conductive member is arranged between a positive electrode and a negative electrode which are disposed in opposition to each other, characterized by orienting ion channels of said ion conductive member so that said ion conductive member may have a higher ionic conductivity in a direction of joining a plane of said positive electrode and that of said negative electrode wherein said ion conductive member has a layered structure or a columnar structure.

36. A process for producing a secondary battery as defined in claim 35, wherein said ion conductive member has either of a layered structure and a columnar structure.

37. A process for producing a secondary battery as defined in claim 36, wherein said ion conductive member having either of the layered structure and the columnar structure is formed via at least one step selected from the group consisting of irradiation with light, application of a magnetic field, application of an electric field, and heating.

38. A process for producing a secondary battery as defined in claim 36, wherein said ion conductive member having either of the layered structure and the columnar structure is fabricated via the steps of orienting a polymer, and inducing a cross-linking reaction, thereby to prepare a cross-linked polymer which is a matrix of said ion conductive member.

39. A process for producing a secondary battery as defined in claim 36, wherein said ion conductive member having either of the layered structure and the columnar structure is formed via the steps of orienting a monomer and a cross-linking agent, and polymerizing and cross-linking them, thereby to prepare a cross-linked polymer which is a matrix of said ion conductive member.

40. A process for producing a secondary battery as defined in claim 38, wherein the polymer is either of a liquid-crystalline compound and a diacetylene compound.

41. A process for producing a secondary battery as defined in claim 38, wherein at least either of the monomer and the cross-linking agent is either of a liquid-crystalline compound and a diacetylene compound.

42. A process for producing a secondary battery as defined in claim 38, wherein a compound whose molecule has a liquid-crystalline structure is added as a template for orienting the polymer.

43. A process for producing a secondary battery as defined in claim 39, wherein a compound whose molecule has a liquid-crystalline structure is added as a template for orienting at least either of the monomer and the cross-linking agent.

44. A process for producing a secondary battery as defined in claim 42 or claim 43, wherein the compound whose molecule has the liquid-crystalline structure is an amphiphilic compound.

45. A process for producing a secondary battery as defined in either of claims 38 and 39, wherein said ion conductive member is fabricated by causing the cross-linked polymer to absorb an electrolyte solution (which is a solution obtained by dissolving a supporting electrolyte in a solvent) and solidify.

46. A process for producing a secondary battery as defined in either of claims 38 and 39, wherein said ion conductive member is fabricated by adding an electrolyte solution (which is a solution obtained by dissolving a supporting electrolyte in a solvent) during the preparation of the cross-linked polymer (that is, before the cross-linking reaction).

47. A process for producing a secondary battery as defined in either of claims 38 and 39, wherein the cross-linked polymer is in the shape of either of a film and a sheet.

48. A process for producing a secondary battery as defined in either of claims 38 and 39, wherein the cross-linked polymer is in the shape of either of grains and powder.

49. A process for producing a secondary battery as defined in claim 36, comprising the step of laminating a negative electrode, an ion conductive member having either of a layered structure and a columnar structure, and a positive electrode in the order mentioned, thereby to form a layer body.

50. A process for producing a secondary battery as defined in claim 45, comprising the step of laminating a negative electrode, a cross-linked polymer material having either of a layered structure and a columnar structure, and a positive electrode in the order mentioned, thereby to form a layer body, and the step of causing the cross-linked polymer material to absorb an electrolyte solution (which is a solution obtained by dissolving a supporting electrolyte in a solvent) and solidify.

51. A process for producing a secondary battery as defined claim 38 or claim 39, comprising the step of interposing a spacer between a negative electrode and a positive electrode so as to avoid contact between the negative electrode and the positive electrode and to hold a predetermined distance between said negative electrode and said positive electrode, and thereafter forming an ion conductive member which has either of a layered structure and a columnar structure, between said negative electrode and said positive electrode.

52. A process for producing a secondary battery as defined in claim 49, wherein the ion conductive member having either of the layer structure and the columnar structure is formed on a surface of at least either of the negative electrode and the positive electrode.

53. A process for producing a secondary battery as defined in claim 50, wherein a polymer layer having either of the layer structure and the columnar structure is formed on a surface of at least either of the negative electrode and the positive electrode.

54. A process for producing a secondary battery as defined in claim 51, wherein the spacer is made of either of nonwoven fabric and beads selected from the group consisting of resin beads, glass beads and ceramic beads.

* * * * *

UNITED STATES PATENT AND TRADEMARK OFFICE
CERTIFICATE OF CORRECTION

PATENT NO.    : 6,372,387 B1
DATED         : April 16, 2002
INVENTOR(S)   : Soichiro Kawakami et al.

It is certified that error appears in the above-identified patent and that said Letters Patent is hereby corrected as shown below:

<u>Column 3,</u>
Line 60, "an-aspect" should read -- an aspect --.

<u>Column 5,</u>
Line 4, "tonically" should read -- ionically --.

<u>Column 7,</u>
Line 16, "is" should read -- being --;
Line 67, "Invention" should read -- invention --.

<u>Column 8,</u>
Line 33, "Alternatively," should read -- ¶Alternatively, --.

<u>Column 10,</u>
Line 20, "metharylate," should read -- methacrylate, --.

<u>Column 13,</u>
Line 29, "more" should be deleted;
Line 40, "oxytoluxen" should read -- oxytoluxene --.

<u>Column 14,</u>
Line 66, "interactions" should read -- interaction --.

<u>Column 17,</u>
Line 38, "meshes," should read -- mesh, --.

<u>Column 18,</u>
Line 29, "meshes," should read -- mesh, --;
Line 56, "chlorobenzen;" should read -- chlorobenzene; --.

<u>Column 21,</u>
Line 57, "was-dried." should read -- was dried. --.

<u>Column 22,</u>
Line 21, "was" should read -- were --.

<u>Column 24,</u>
Line 5, "field" should read -- field of --.

UNITED STATES PATENT AND TRADEMARK OFFICE
CERTIFICATE OF CORRECTION

PATENT NO. : 6,372,387 B1
DATED : April 16, 2002
INVENTOR(S) : Soichiro Kawakami et al.

It is certified that error appears in the above-identified patent and that said Letters Patent is hereby corrected as shown below:

Column 26,
Line 32, "tetramine" should read -- tetraamine --.

Column 27,
Line 58, "was" should read -- were --;
Line 64, "let" should read -- allowed --.

Column 38,
Line 67, "opposing" should read -- opposite --.

Column 45,
Line 58, "electrolyte" should read -- electrolytes --.

Column 46,
Line 43, "let" should read -- allowed --.

Column 48,
Line 51, "let" should read -- allowed --.

Column 49,
Line 12, "titanlum-clad" should read -- titanium-clad --.

Column 50,
Line 45, "dioxie," should read -- dioxide, --.

Column 54,
Line 41, "electrode" should read -- electrode, --.

Column 55,
Line 2, "claim 38," should read -- claim 39, --.

UNITED STATES PATENT AND TRADEMARK OFFICE
CERTIFICATE OF CORRECTION

PATENT NO.    : 6,372,387 B1
DATED         : April 16, 2002
INVENTOR(S)   : Soichiro Kawakami et al.

It is certified that error appears in the above-identified patent and that said Letters Patent is hereby corrected as shown below:

Column 56,
Line 13, "defined" should read -- defined in --.

Signed and Sealed this

Twenty-ninth Day of April, 2003

JAMES E. ROGAN
*Director of the United States Patent and Trademark Office*